United States Patent
Shimizu

(10) Patent No.: US 8,052,243 B2
(45) Date of Patent: Nov. 8, 2011

(54) IMAGE PROCESSING DEVICE, IMAGE RECORDING DEVICE, IMAGE PROCESSING METHOD, AND RECORDING MEDIUM WITH IMAGE PROCESSING PROGRAM

(75) Inventor: Tohru Shimizu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 919 days.

(21) Appl. No.: 12/041,020

(22) Filed: Mar. 3, 2008

(65) Prior Publication Data

US 2008/0247007 A1    Oct. 9, 2008

(30) Foreign Application Priority Data

Apr. 4, 2007  (JP) ................ 2007-098249

(51) Int. Cl.
*B41J 29/393* (2006.01)
(52) U.S. Cl. ................ 347/19; 347/15; 347/40
(58) Field of Classification Search ......... 347/9, 12, 347/14, 15, 19, 40–43, 81
See application file for complete search history.

(56) References Cited

U.S. PATENT DOCUMENTS

| 6,520,623 | B2* | 2/2003 | Miyake et al. | 347/40 |
| 7,465,005 | B2* | 12/2008 | Walmsley et al. | 347/12 |
| 2009/0128594 | A1* | 5/2009 | Martinez et al. | 347/14 |

FOREIGN PATENT DOCUMENTS

| JP | 6-71889 | 3/1994 |
| JP | 2001-315318 | 11/2001 |
| JP | 2004-142196 | 5/2004 |

* cited by examiner

*Primary Examiner* — Thinh Nguyen
(74) *Attorney, Agent, or Firm* — Fildes & Outland, P.C.

(57) ABSTRACT

An image processing device including: an acquisition unit that acquires image data for recording with a liquid droplet ejecting head having a plurality of ejection nozzles that eject liquid droplets onto a recording medium, and data relating to a faulty ejection nozzle of the liquid droplet ejecting head; a generation unit that generates recording data in units of pixels corresponding to the ejection nozzles based on the image data; a conversion unit that, based on data relating to the faulty ejection nozzle, converts the recording data in units of rows of pixels to be recorded by each of the ejection nozzles so as to reduce the number of pixels to be recorded by the faulty ejection nozzle; and an output unit that outputs the converted recording data to the liquid droplet-ejecting head.

19 Claims, 16 Drawing Sheets

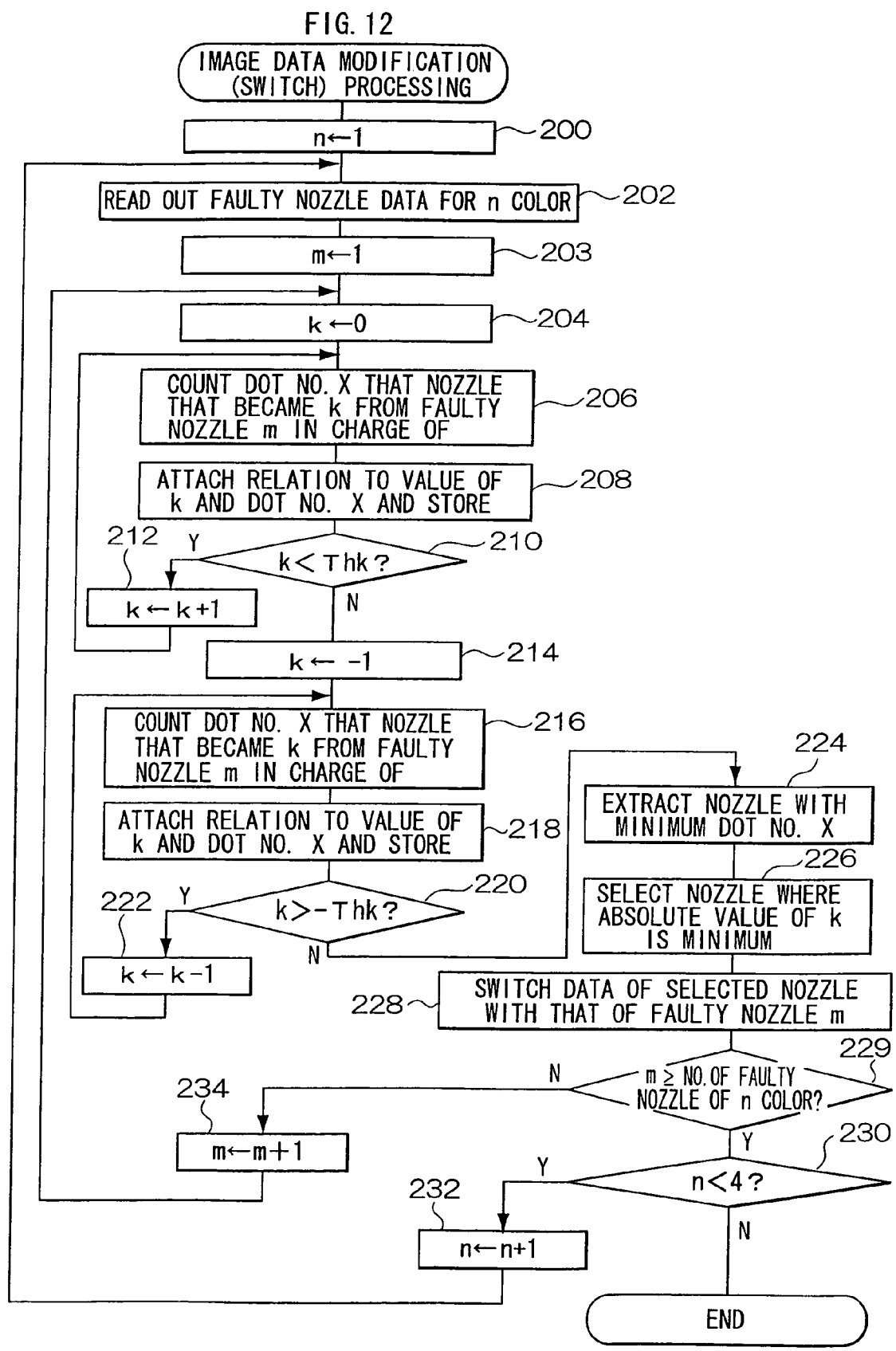

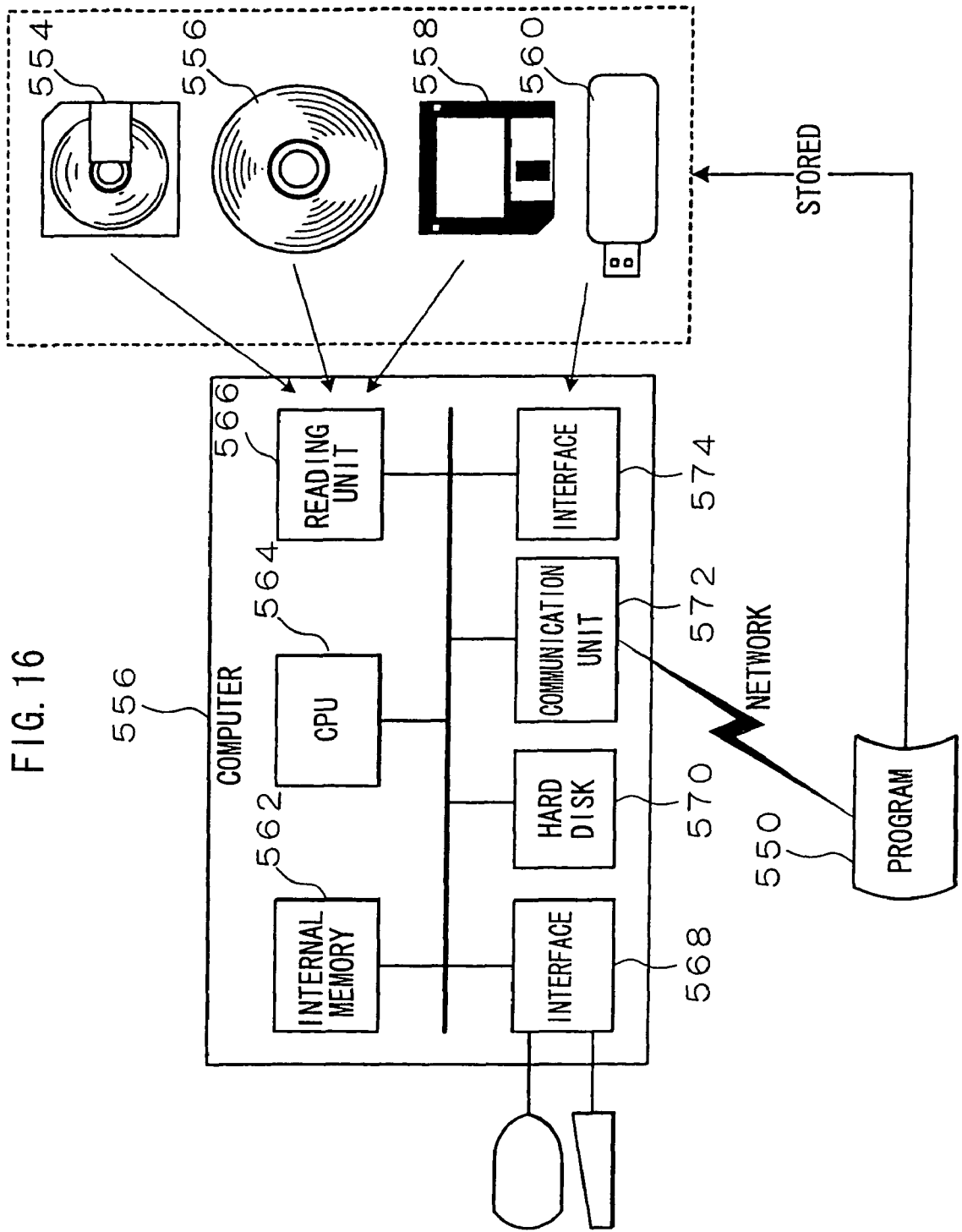

IMAGE PROCESSING DEVICE, IMAGE RECORDING DEVICE, IMAGE PROCESSING METHOD, AND RECORDING MEDIUM WITH IMAGE PROCESSING PROGRAM

CROSS-REFERENCE TO RELATED APPLICATION

This application claims priority under 35 USC 119 from Japanese Patent Application No. 2007-098249 filed Apr. 4, 2007, the disclosure of which is incorporated by reference herein.

BACKGROUND OF THE INVENTION

1. Technical Field

The present invention relates to an image processing device, an image recording device, an image processing method, and a storage medium that contains an image processing program.

2. Related Art

With a droplet ejecting device such as an inkjet printer, images are formed by driving recording heads in response to image data and making the recording heads eject ink droplets from the nozzles of the recording heads onto the recording medium.

With these types of recording heads, there are instances where some of the nozzles enter a state where the ink droplets cannot be properly ejected (i.e., where the direction of ejection or the droplet volume of the ink droplets are faulty); or when they enter a state of faulty ejection such as a state where ejection becomes impossible. These states can occur due to the condition in which the ink is supplied to the nozzles or due to clogging of the nozzles. When there are nozzles that are in such states of defective ejection, ejection of ink droplets corresponding to the image data is not properly performed at the positions facing the faulty ejection nozzles. For this reason, streaks are generated in the image on the recording medium.

SUMMARY

According to an aspect of the invention, there is provided an image processing device including: an acquisition unit that acquires image data for recording with a liquid droplet ejecting head having a plurality of ejection nozzles that eject liquid droplets onto a recording medium, and data relating to a faulty ejection nozzle of the liquid droplet ejecting head; a generation unit that generates recording data in units of pixels corresponding to the ejection nozzles based on the image data; a conversion unit that, based on data relating to the faulty ejection nozzle, converts the recording data in units of rows of pixels to be recorded by each of the ejection nozzles so as to reduce the number of pixels to be recorded by the faulty ejection nozzle; and an output unit that outputs the converted recording data to the liquid droplet-ejecting head.

BRIEF DESCRIPTION OF THE DRAWINGS

Exemplary embodiments of the present invention will be described in detail based on the following figures, wherein:

FIG. 12 is a flowchart showing the flow of image data modification processing executed in the image recording processing according to a second exemplary embodiment;

FIG. 16 is an explanatory diagram of an example of a computer program when the functions of image data modification processing are realized with the computer program, and of a recording medium in which the computer program is stored and of the computer.

DETAILED DESCRIPTION

Hereafter, examples of exemplary embodiments of the present invention will be described in detail with reference to the drawings.

First Exemplary Embodiment

Figure 1:
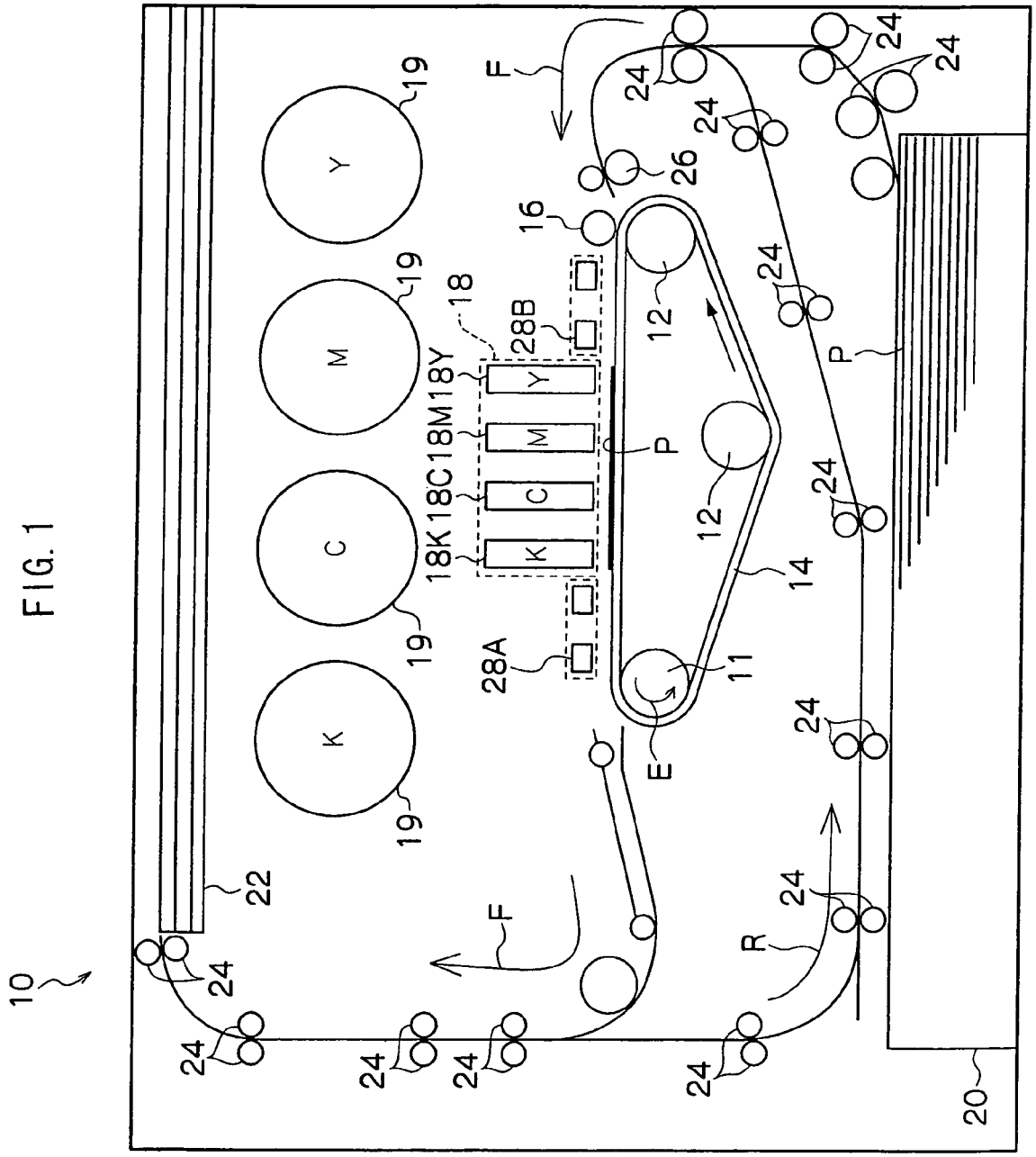
FIG. 1 is an outline drawing showing the configuration of an image recording device according to an exemplary embodiment.

The outline of the configuration of an image recording device 10 according to the first exemplary embodiment is shown in FIG. 1. As shown in FIG. 1, the image recording device 10 is configured to include a paper supply tray 20, a paper discharge tray 22, and plural rollers 24.

Recording paper P is stored inside the paper supply tray 20. At the time of image formation, the recording paper P inside the paper supply tray 20 is pulled out one sheet at a time by the rollers 24, conveyed along a preset conveying route F inside the image recording device 10, and discharged to the paper discharge tray 22.

A conveying belt 14 and an adsorber 16 are arranged on this conveying route F of the recording paper P. The conveying belt 14 is stretched across a drive roll 11 that rotates and drives in the direction of the E arrow and two driven rolls 12 that rotate with the rotational driving of the drive roll 11. The adsorber 16 presses the recording paper P that was conveyed thereto on the conveying path F against the conveying belt 14 and imparts an electrical charge to the recording paper P, thereby making it electrostatically adsorb to the conveying belt 14.

Also, a resist roll 26 is arranged at the upstream side of the conveying belt 14 at the conveying route F of the recording paper P. The resist roll 26 prevents the recording paper P conveyed along the conveying path F from adsorbing to the conveying belt 14 in a state where it is skewed relative to the direction of conveyance, and performs skew correction for the paper.

Further, a recording head array 18 is provided on the conveying route F of the recording paper P at a position facing the recording surface of the recording paper P that is electrostatically adsorbed to the conveying belt 14. The recording head array 18 comprises four recording heads 18Y, 18M, 18C, 18K that eject ink of the four colors yellow (Y), magenta (M), cyan (C), and black (K).

Head units provided with plural ejection nozzles N (not shown) for each recording head 18Y, 18M, 18C, 18K of each color are arranged across the entire widthwise direction of the conveying belt 14. This makes the device a full-width array (FWA) type configured from multiple ejection nozzles N.

With regard to the ejection system for the ink droplets, well-known systems for recording heads can be appropriately used such as a thermal system or piezoelectric system and the like.

Note that hereafter, letters from the alphabet (Y/M/C/K) indicating each color will be attached to the end of the number for the component provided at each color. Also, when explanations are made without particular distinction between colors, these letters will be omitted from the ends of the numbers.

As shown in FIG. 1, the image recording device 10 according to this exemplary embodiment is configured to include a conveying route R for side-reversing. When printing on both sides, an image is formed on one side, after which the recording paper P is conveyed along the conveying route R, whereby reversal of the front and back is performed so that the back surface side of the side where the image was formed faces each of the recording heads 18Y, 18M, 18C, 18K.

Also, ink tanks 19, each storing a respective color of ink, are provided between the conveying belt 14 and the paper discharge tray 22. The inks of the ink tanks 19 are supplied to each of the recording heads 18Y, 18M, 18C, 18K through ink-supply pipes (not shown).

Note that with regard to the types of inks that can be used in the image recording device 10 shown in FIG. 1, all types of known inks can be used such as aqueous inks, oil-based inks, and solvent-type inks.

The recording heads 18Y, 18M, 18C, 18K are configured to be able to move away from the conveying belt 14 due to a drive mechanism (not shown).

Further, maintenance devices 28A and 28B are respectively provided at the upstream side and downstream side of the conveying route F of the recording heads 18Y, 18M, 18C, 18K. The maintenance device 28A is configured to include maintenance units 30K, 30C for black and cyan. The maintenance device 28B is configured to include maintenance units 30M, 30Y for magenta and yellow. Each of the maintenance devices 28A, 28B are configured to be movable with drive mechanisms (not shown) in the directions that approach each other.

Figure 2:
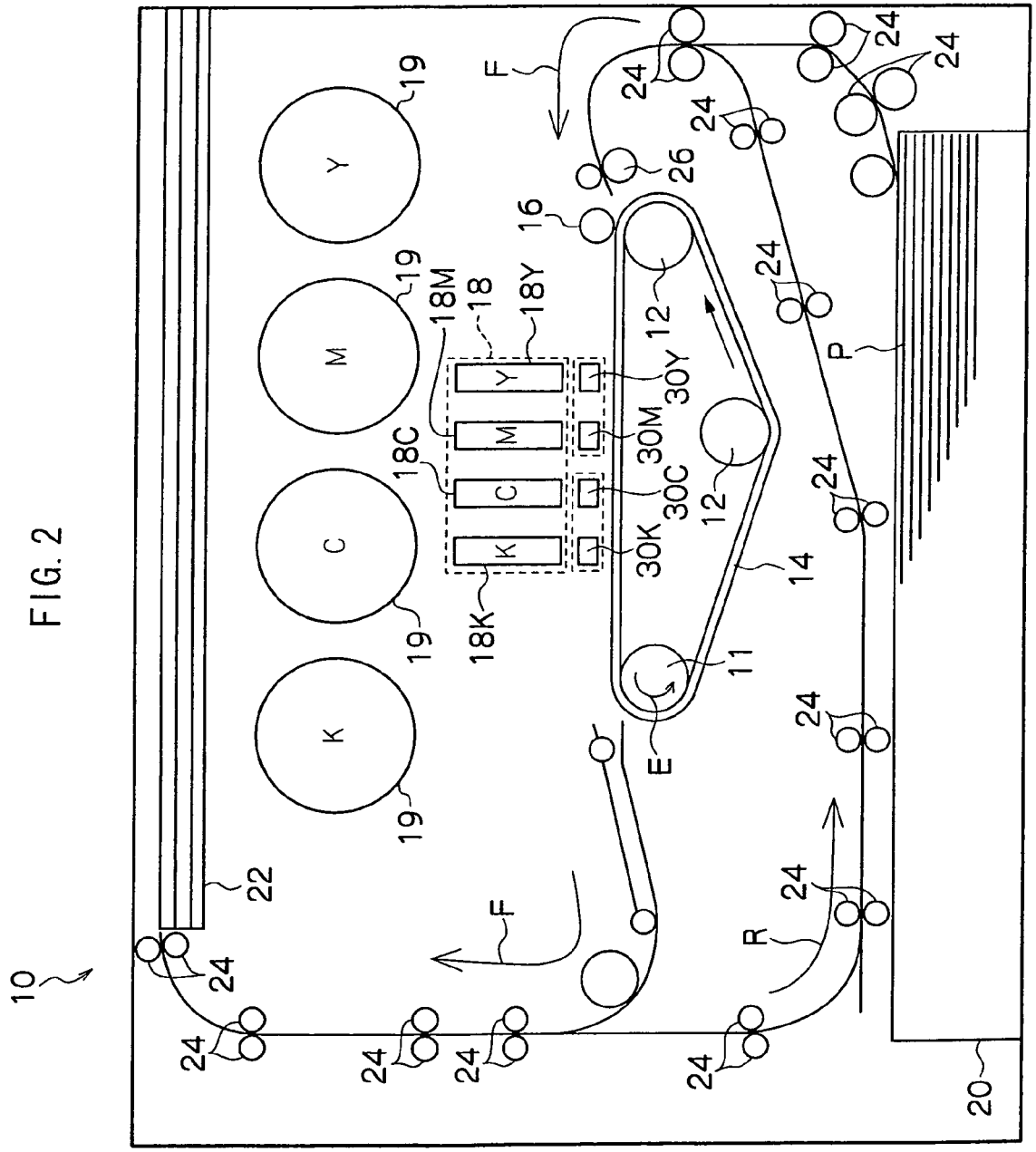
FIG. 2 is a drawing showing position relations between the recording heads, maintenance device, and conveying belt when performing maintenance on the image recording device.

As shown in FIG. 2, when performing maintenance, the recording heads 18Y, 18M, 18C, 18K are moved away from the conveying belt 14. Further, when performing maintenance, the maintenance devices 28A, 28B are moved into the space drafted between the recording heads 18Y, 18M, 18C, 18K and the conveying belt 14 due to the recording heads 18Y, 18M, 18C, 18K moving away.

Due to this, the maintenance units 30Y, 30M, 30C, 30K of the maintenance devices 28A, 28B are arranged to face the four recording heads 18Y, 18M, 18C, 18K. Due to this, maintenance processing can be suitably executed by each maintenance unit 30.

Note that the maintenance processing that is performed by the maintenance units 30 can include processes such as suctioning of ink droplets from within the ejection nozzles N, wiping of ink droplets adhered to the ejection ports of the ejection nozzles N, and supplying of ink droplets to the insides of the ejection nozzles N.

Figure 3:
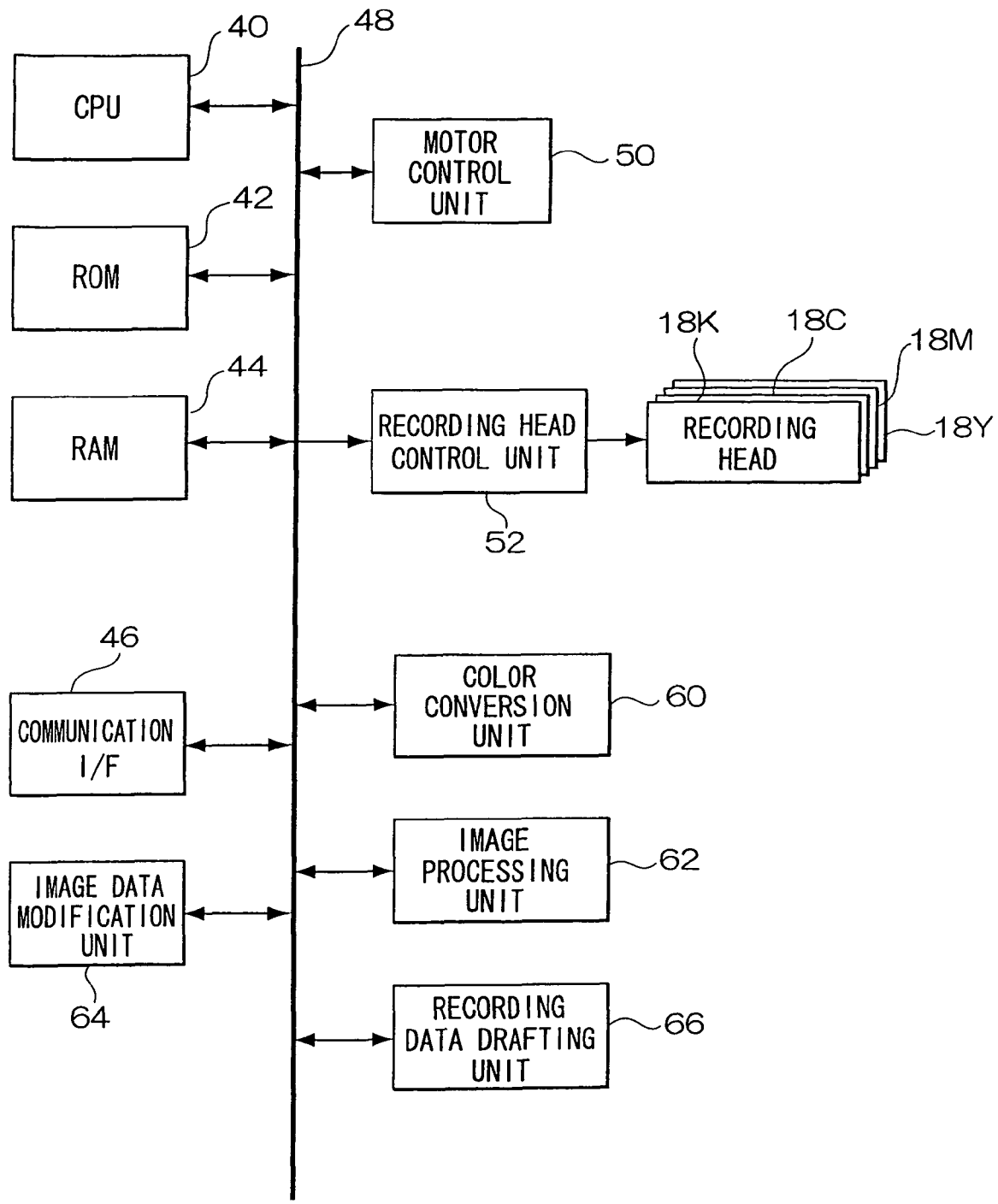
FIG. 3 is a block diagram showing the configuration of a control system according to an exemplary embodiment.

A function block diagram is shown in FIG. 3 where the configuration of the control system of the image recording device 10 according to the present exemplary embodiment is shown. As seen in FIG. 3, the image recording device 10 is configured to include a central processing unit (CPU) 40 that controls the operation of the entire device; a ROM 42; a RAM 44; and a communication interface (I/F) 46. These CPU 40, ROM 42, RAM 44, and communication I/F 46 are each connected to a BUS 48.

Various programs and data and the like are stored in the ROM 42 in advance, and these include a control program that is executed primarily by the CPU 40 and which controls the device overall. Also, various data and the like that accompanies the CPU 40 processing are temporarily stored in the RAM 44.

Further, the communication I/F 46 is connected to an external terminal either wired or wirelessly through a network (not shown) or a communication circuit (not shown). The communication I/F 46 receives image data that will be recorded on the recording paper P from this external terminal.

The image recording device 10 is also configured to include a color conversion unit 60, an image processing unit 62, an image data modification unit 64, and a recording data drafting unit 66, and these are each connected to the BUS 48.

The received image data is converted into image data of CMYK colors with the color conversion unit 60. With the image processing unit 62, image processing such as halftone processing and the like is performed on the CMYK color image data, and dot data for each color CMYK of preset gradation numbers is drafted for each of the plural nozzles.

The dot data are modified at the image data modification unit 64 into units of rows to be recorded by one ejection nozzle N, based on the dot data of each color CMYK drafted by the image processing unit 62 and the faulty nozzle data of the recording heads 18.

The faulty nozzle data is position-identifying data on any ejection nozzle N among the ejection nozzles N provided at the recording heads 18 with which ejection of ink droplets cannot be properly performed. With the present exemplary embodiment, the faulty nozzle data is stored in advance in the ROM 42 for each of the recording heads 18C, 18M, 18Y, 18K.

Note that states where an ejection nozzle N cannot properly perform ejection of ink droplets include cases where the ink droplets will not eject, where the direction of ejection of the ink droplets is outside an allowable range, or where there are large fluctuations in the droplet volume of the ejected ink droplets.

The faulty nozzle data is drafted based on a detection result, where ink droplets are actually made to eject from the recording heads 18 in advance and the ejection nozzles N that cannot properly perform ejection are detected.

With the image data modification unit 64, faulty nozzle data showing the positions of faulty nozzles is read out from the ROM 42, the positions of faulty nozzles for the recording heads 18C, 18M, 18Y, 18K of each color are specified, and the image data is modified.

Also, with the present first exemplary embodiment, the image data modification unit 64 is designed to modify (i.e., shift process) the data so all of the dot data is shifted by the same number of nozzles in a preset direction, such that the number of dots that should be outputted by the faulty nozzle decreases. Note that with the present exemplary embodiment, the ejection nozzles N are arranged in one row in a direction that is orthogonal to the direction in which the recording medium moves. Accordingly, the modification involves shifting by one-dot unit intervals in the direction in which the ejection nozzles N are arranged, and thus making the recording position of the entire image shift.

Figure 9A:
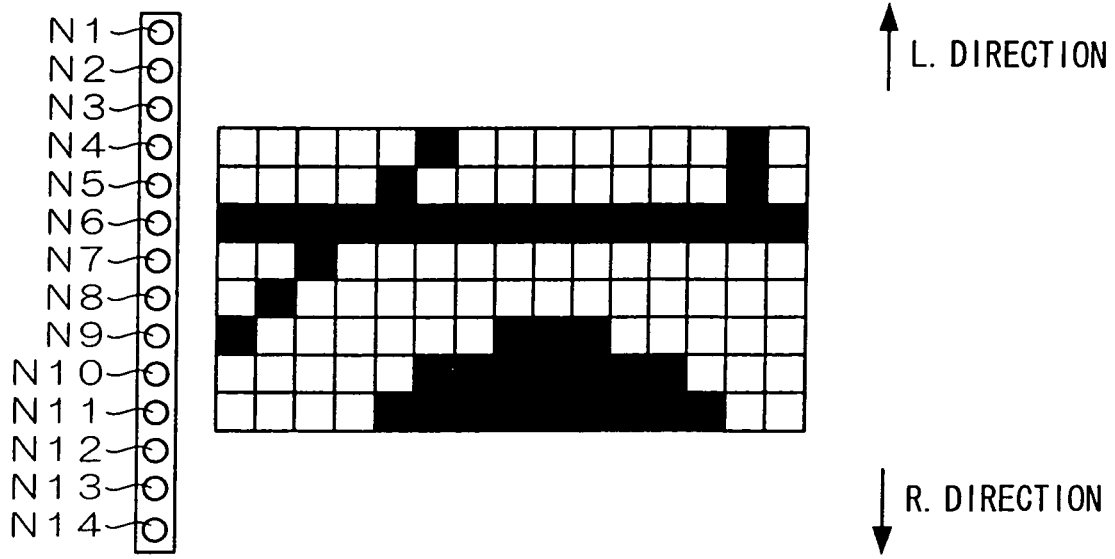
FIG. 9A is a drawing showing with patterns the relation between the ejection nozzles of the recording head and the dot data each ejection nozzle records.
Figure 9B:
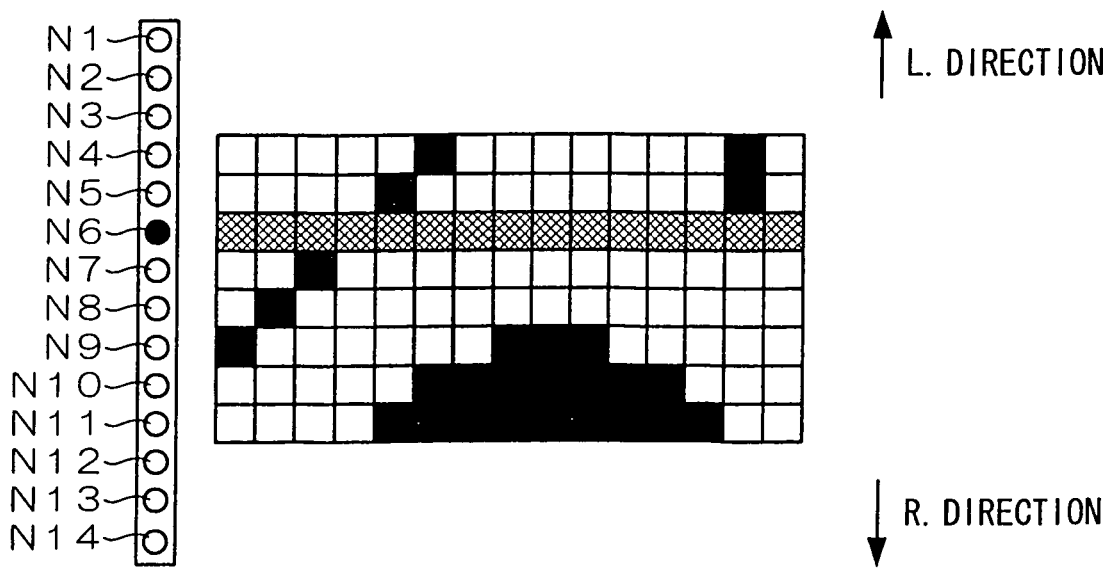
FIG. 9B is a drawing showing the missing dots when a faulty nozzle exists.

That is, as shown in FIG. 9A, the number of dots each ejection nozzle N records is different depending on the position of the ejection nozzle N. For example, ejection nozzle N 6 continuously ejects ink droplets and forms a straight-line image. Note that FIG. 9A and FIG. 9B are drawings that show with patterns the relation between the ejection nozzle N of the recording heads 18 and the dot data that each ejection nozzle N records. The ejection nozzles N are shown as white circles, and the dot data is shown as quadrilateral shapes and with regard to the dots where ink should be ejected, these are colored in black. Also, the numbers assigned to the ejection nozzles N indicate the identification number of the ejection nozzles N and the numbers assigned thereto are 1-14. Note that in FIG. 9A and FIG. 9B, in order to avoid complicating the explanation, the number of ejection nozzles N was made 14 and the dot data is shown for eight portions of ejection nozzles N. However, in the actual recording heads 18, many ejection nozzles N are provided in relation to factors such as the resolution of the image recording device 10 and the size of the recording paper P that can be used with the image recording device 10.

In FIG. 9B, an example is shown where the ejection nozzle N 6 is a faulty nozzle and the ejection nozzle N 6 is filled in black (as a faulty nozzle). As shown in FIG. 9B, this ejection nozzle N 6 is a faulty nozzle, i.e., is non-ejecting or a nozzle that does not eject as intended (i.e., so that image deterioration is caused when ejecting because fluctuations in ejection direction or droplet amount exceed allowable ranges) such that this nozzle is one where the data requires modification. In this case, the dots indicated filled in with a lattice form are those from which ink droplets are not ejected. Due to this, straight-lined images are not formed (i.e., are missing). Note that hereafter in the explanations, the number of dots a faulty nozzle is supposed to output (i.e., record) is also referred to as "missing number of dots".

Figure 10A:
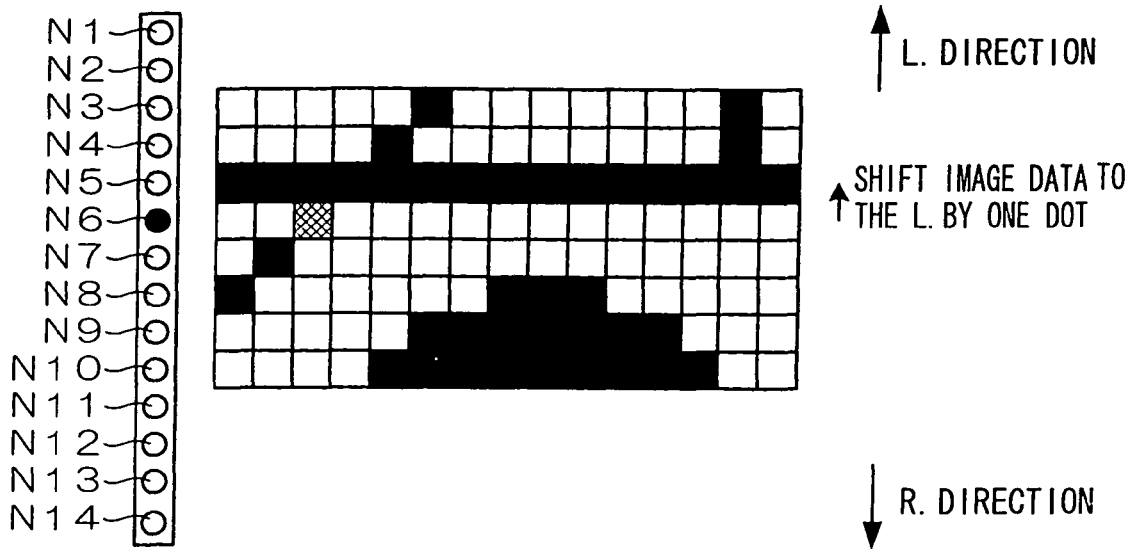
FIG. 10A is a drawing showing the dot data when the dot data is shifted one dot in the left direction in the embodiment shown in FIG. 9B.
Figure 10B:
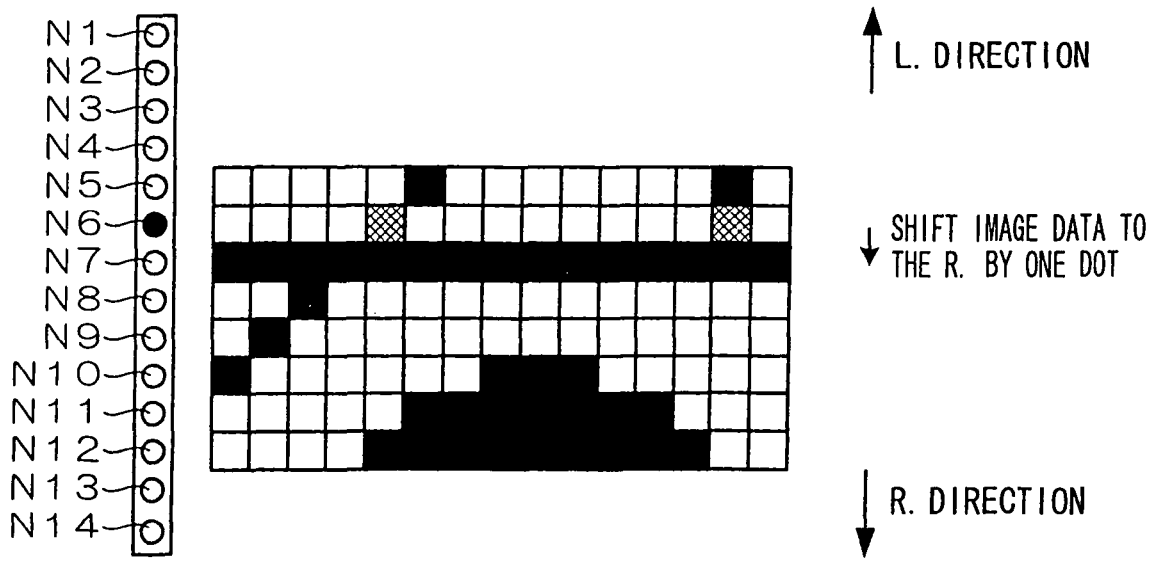
FIG. 10B is a drawing showing the dot data when the dot data is shifted one dot in the right direction in the embodiment shown in FIG. 9B.

As an example shown in FIG. 10A and FIG. 10B, the image data is shifted in either the left or right direction in units of one dot, whereby there are cases where the number of dots (missing number of dots) recorded by the faulty nozzle decrease (in the example shown in FIG. 10A and FIG. 10B, ejection nozzle N 6).

With the recording data drafting unit 66, the dot data for each color CMYK appropriately modified by the image data modification unit 64 are each converted into a decipherable data structure in a recording head control unit 52 (to be described later). Due to this, recording data for each color CMYK where the lining of the data has been changed is drafted so that the arrangement of each ejection nozzle N for each recording head 18C, 18M, 18Y, 18K are changed to a sequence that considers the sequence of recording (i.e., transfer sequence).

The image recording device 10 is also configured to include a motor control unit 50 and the recording head control unit 52 as well. The motor control unit 50 and recording head control unit 52 are connected to the BUS 48.

The recording head control unit 52 determines the elements corresponding to the ejection timing of the liquid droplets and the ejection nozzle N to be used for the recording heads 18C, 18M, 18Y, 18K for each color in response to the recording data drafted with the recording data drafting unit 66. Next, the recording head control unit 52 applies a drive signal to the determined (chosen) elements.

Also, the motor control unit 50 controls a motor (not shown) for driving portions such as the rollers 24, the drive roll 11, and the maintenance devices 28 and also controls the conveyance of the recording paper P and maintenance operation.

Hereafter, the operation of the present exemplary embodiment will be explained.

When image data is inputted from an external terminal (not shown), image recording processing is executed by the CPU 40.

Figure 4:
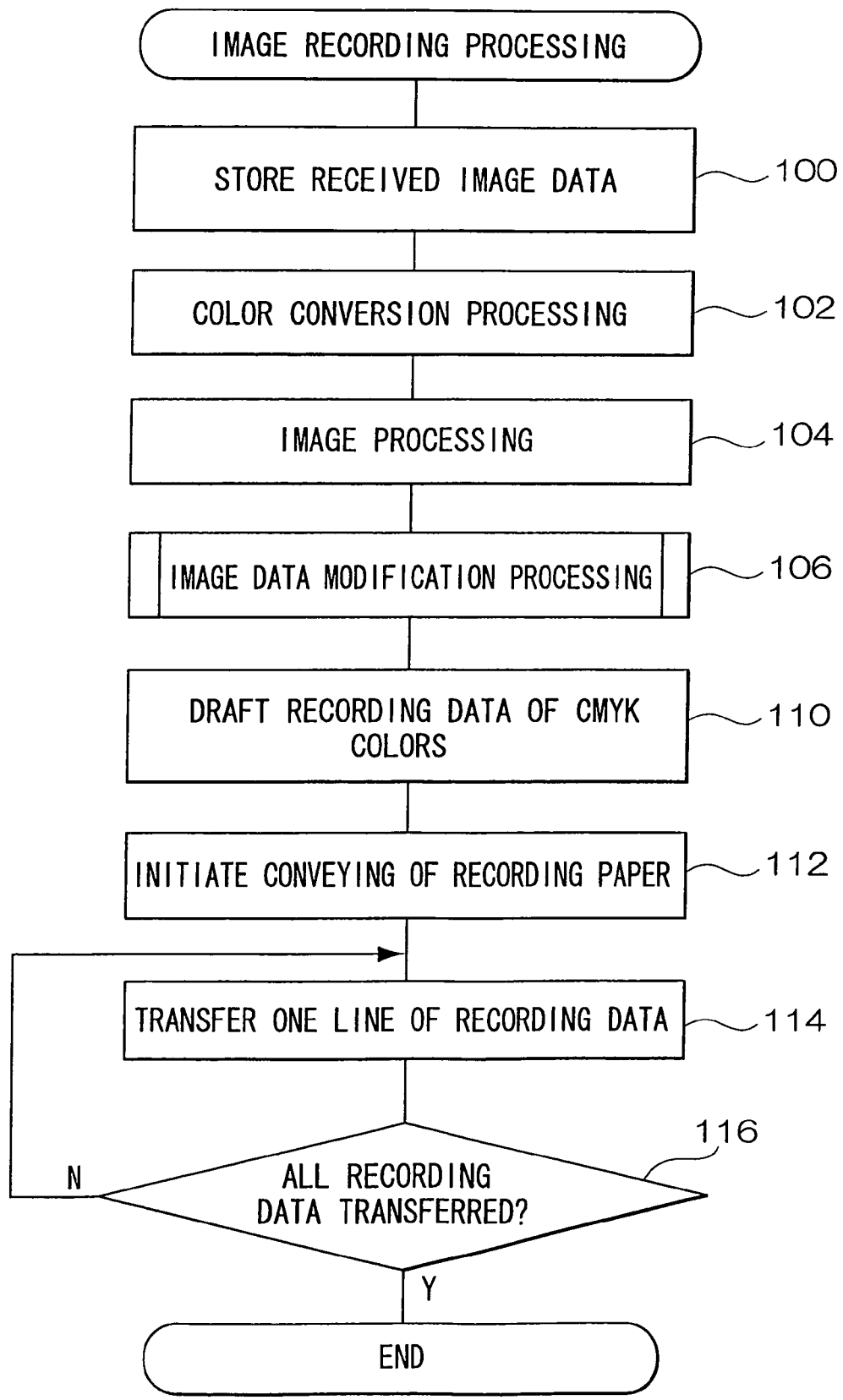
FIG. 4 is a flowchart showing the flow of image recording processing according to an exemplary embodiment.

FIG. 4 is a flowchart showing the flow of processing of the image recording processing program executed mainly by the CPU 40. Hereafter, the image recording processing according to the present exemplary embodiment will be explained while referring to FIG. 4. Note that the image recording processing program is stored in advance in a preset region of the ROM 42.

First, at step 100, the received image data is stored in the RAM 44. At the next step 102, YMCK image data is drafted by performing color conversion processing on the image data.

At the next step 104, the appropriate image processing is performed on the YMCK image data by the image processing unit 62. For example, a means of halftone processing is used such as a design method or error diffusion method and the like and dot data that can be recorded with the recording heads 18 is drafted. Specifically, if, for example, the YMCK image data that is drafted based on the received image data has 256 gradations and the number of gradations recordable with the recording heads 18 is in four levels, dot data of four gradations is drafted for each color from the image data of 256 gradations.

At the following step 106, the image data that should be modified, based on the dot data and faulty nozzle data for each color of the recording heads 18C, 18M, 18Y, 18K, is modified by the image data modification unit 64 and image data modification processing is executed (details will be provided later, see FIG. 5). After that, the process moves to step 110.

At step 110, the dot data for each of the CMYK colors is converted into a decipherable data structure at the recording head control unit 52, and recording data is drafted where the data has been sorted into recording sequences (i.e., transfer sequences) that consider the arrangement of each ejection nozzle N of each of the recording heads 18C, 18M, 18Y and 18K. After that, the process moves to step 112 and the conveyance of the recording paper P is initiated via a motor control unit 50. Because of this, the recording paper P is conveyed along the conveying route F from the paper supply tray 20 and conveyed by the conveying belt 14.

Once the recording paper P is conveyed onto the conveying belt 14, it is adsorbed with static electricity to the conveying belt 14 by the adsorber 16. After that, each of the recording heads 18 receive spray-enabling signals that are consecutively turned on at timing where the leading edge of the recording paper P arrives at a record position for each of the recording heads 18Y, 18M, 18C and 18K (i.e., the spraying positions of the ink ejected out from the recording heads 18). In this manner, the images of each color are overlapped on the recording paper P and a color image is formed.

Next, at step 114, the recording data of one portion of a line to be recorded is transferred to the recording head control unit 52. After that, the process moves to step 116 and it is determined whether the recording data was transferred. When there is recording data that has not yet been transferred, a negative determination is made at step 116 and the routine returns to step 114 again.

Also, when an affirmative determination has been made at step 114, it is determined that all of the recording data based on the inputted image data has finished transferring and that the image recording processing has been completed.

Then the recording paper P, for which where printing was performed with the recording heads 18, is conveyed along the conveying route F and discharged to the paper discharge tray 22.

Figure 5:
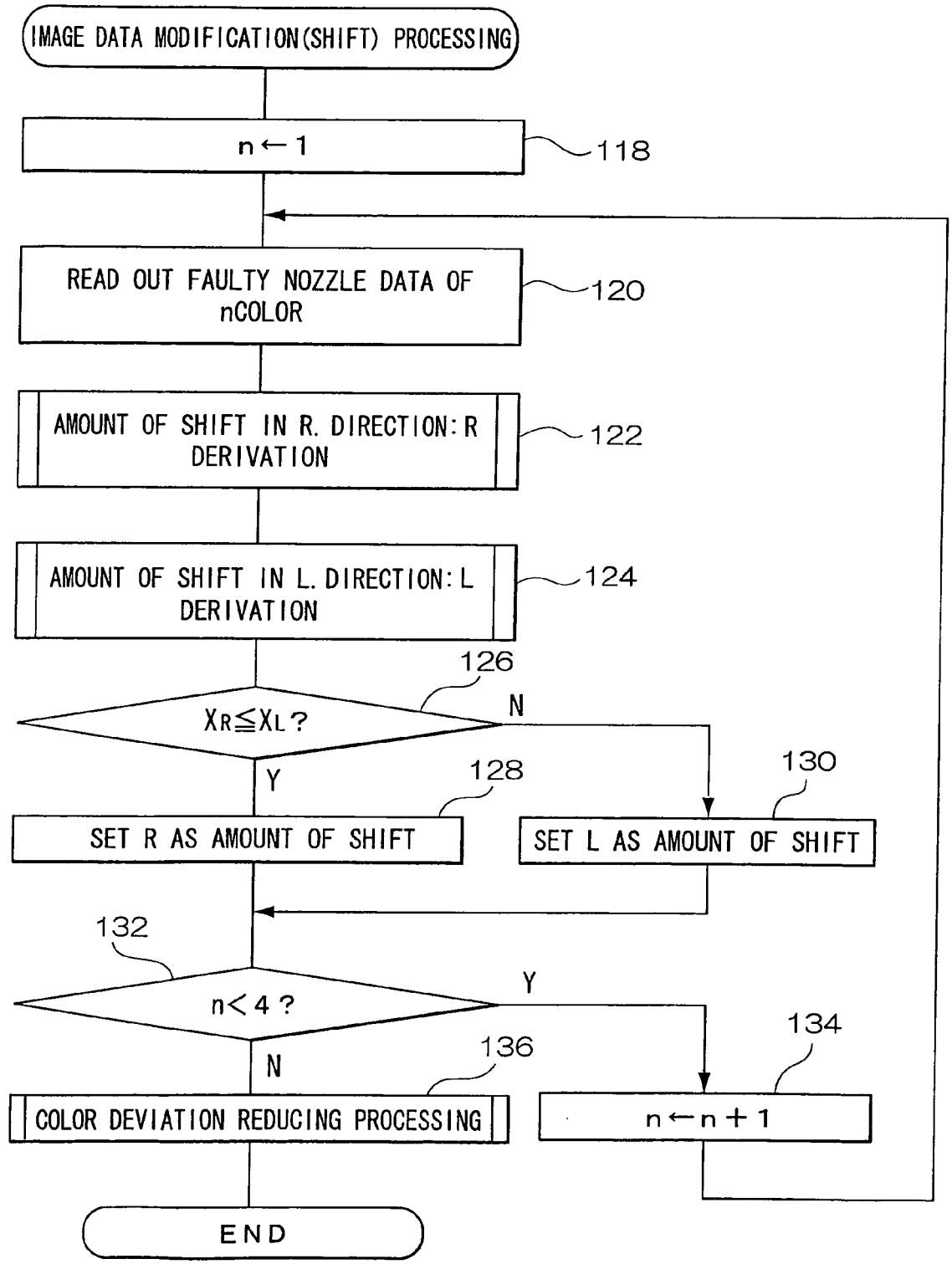
FIG. 5 is a flowchart showing the flow of image data modification processing (shift processing) executed in the image recording processing.

FIG. 5 is a flowchart that shows the flow of the image data modification processing (refer to step 106 in FIG. 4) which is executed by the image data modification unit 64. Hereafter, FIG. 5 will be referred to and the image data modification processing according to the present exemplary embodiment will be explained.

Firstly, at step 118, a variable n that indicates a color identification number is designated as 1. At step 120, the faulty nozzle data of the color identification number n is read out from the ROM 42. After that, the process moves to step 122.

Note that with the present exemplary embodiment, explanations will be made where the color identification number n for n=1 is Y, n=2 is M, n=3 is C, and where n=4 is K.

At step 122, a right shift amount R is derived as the optimum amount of shift (i.e., the number of dots made to shift) when shifting is performed in the right direction. With the next step 124, as in the processing of step 122, a left shift amount L is derived as the optimum amount of shift when shifting is performed in the left direction.

Figure 6:
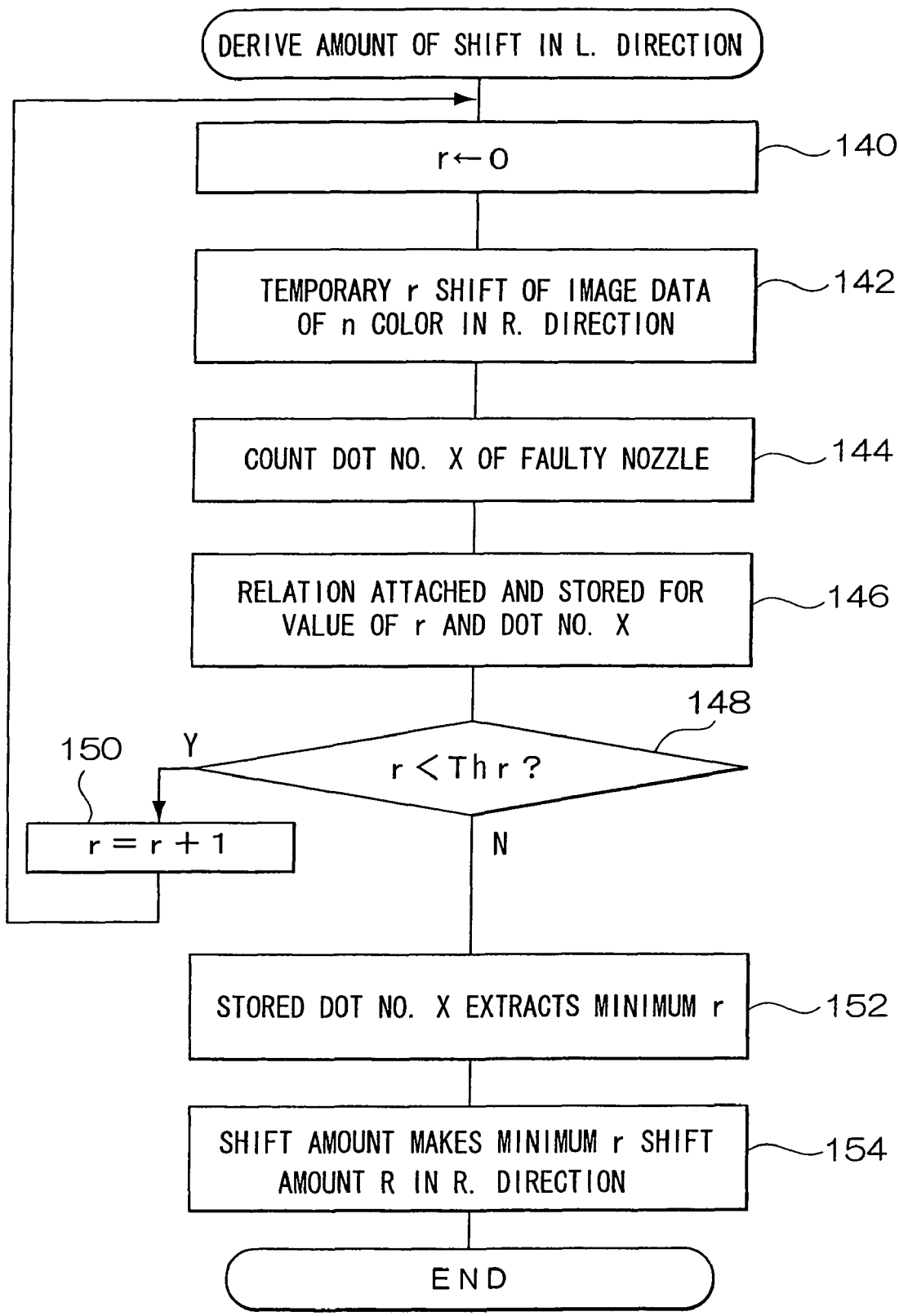
FIG. 6 is a flowchart showing the flow of derivation processing for the amount of shift in the right direction executed in the image data modification processing (shift processing)

FIG. 6 is a flowchart that shows the flow of processing for deriving the amount of shift in the right direction at the above-described step 122. Hereafter, FIG. 6 will be referred to and the derivation of the amount of shift in the right direction according to the present exemplary embodiment will be explained.

First, at step 140, the amount of shift in the right direction r is set as 0 and after that the routine moves to step 142. At step 142, the image data of color that will be processed and is shown by the variable n shifts provisionally in the right direction by r only. After that, the process moves to step 144 and a dot number X that the faulty nozzle should output is counted as the number of missing dots.

At the next step 146, a relation is attached between the value of the set r and the counted number of dots X and then is stored. After that, the process moves to step 148 and it is determined whether the shift amount r is smaller than a threshold Thr that is set in advance. When an affirmative determination is made, the process moves to step 150, the r is incremented (i.e., 1 is added to the r) and then the process returns to step 142 again. If, however, a negative determination is made at step 148, the process moves to step 152.

Note that it is possible to appropriately set the threshold Thr so that the image is settled within the boundaries of the recording paper P.

In this manner, the stored amount of shift in the right direction and the number of dots can be shown as in the following Chart 1.

CHART 1

Amount of shift in R. direction and number of dots

| Amount of shift in R. direction: r | Number of dots: X |
|---|---|
| 0 | 50 |
| 1 | 50 |
| 2 | 10 |
| 3 | 5 |
| 4 | 15 |
| 5 | 5 |
| 6 | 25 |
| ... | ... |
| 50 | 75 |

Note that at step 140, 0 is set to r so a dot number X can be obtained in a state where the image data is not shifted at all.

At step 152, the stored dot number X extracts a minimum shift amount r and after that moves to step 154. At step 154, the r with the minimum amount of shift extracted from the r is designated as a shift amount R in the right direction, and after that ends this right direction shift amount derivation processing. At step 154, when multiple shift conditions where the stored dot number X is minimum exists, i.e., when plural shift amounts r are extracted at step 152, processing is performed where one shift condition (shift amount r) is selected from these.

For example, with the example shown in Chart 1, when the shift amount r=7 to 49 and it is assumed that the number of missing dots X is under 5, a shift amount r=3 and r=5 is extracted by the processing of step 152. Next, with the processing of step 154, the r=3 where the shift amount is the minimum is set as the shift amount R in the right direction.

Figure 7:
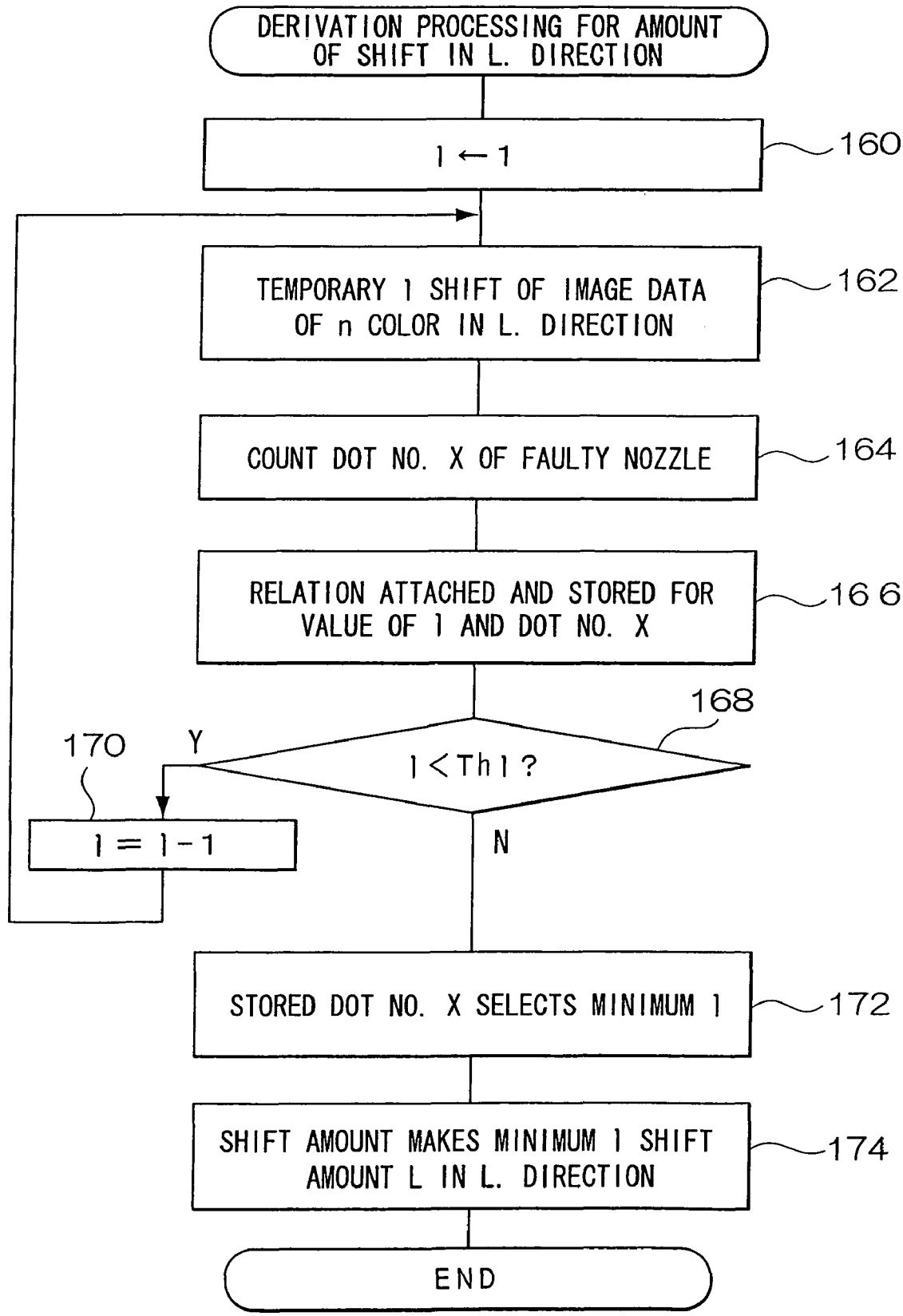
FIG. 7 is a flowchart showing the flow of derivation processing for the amount of shift in the left direction executed in the image data modification processing (shift processing)

FIG. 7 is a flowchart showing the flow of processing of shift amount derivation in the left direction at the above-described step 124. Hereafter, derivation of shift amount in the left direction according to the present exemplary embodiment will be explained while referring to FIG. 7.

First, at step 160, −1 is set as the amount of shift to the left l and after that the routine moves to step 162. At step 162, the image data of the color to be processed which is indicated by the variable n, is shifted provisionally in the left direction by l. After that, the process moves to step 164, and a dot number X that the faulty nozzle should have output is counted as the number of missing dots.

At the next step 166, a relation is attached between the value of the l that is set and the counted number of dots X and then is stored. After that, the process moves to step 168 and it is determined whether the shift amount l is smaller than a threshold Thl that is set in advance. When an affirmative determination is made, the process moves to step 170, the l is decremented (i.e., 1 is subtracted from the l) and then the process returns to step 162 again. If, however, a negative determination is made at step 168, the process moves to step 172.

Note that the threshold Thl can be appropriately set within a range where the image fits into the bounds of the recording paper P, as with the above-described threshold Thr. In addition, it is not necessary for the threshold Thr and threshold Thl to be identical values and these can be appropriately set depending on factors such as the relation between the recording paper P and the size of the image to be recorded, and can be set to be derived for each process.

In this manner, the stored amount of shift in the left direction and the number of dots are shown, for example, as in the following Chart 2.

CHART 2

Amount of shift in the L direction and number of dots

| Amount of shift in L. direction: l | Number of dots: X |
|---|---|
| −1 | 20 |
| −2 | 10 |
| −3 | 0 |
| −4 | 50 |
| −5 | 70 |
| −6 | 90 |
| ... | ... |
| −50 | 6 |

Note that due to the above-described derivation for shift amount in the right direction (see FIG. 6), a dot number X can be obtained in a state where the image data is not shifted at all. Accordingly, with the present shift amount derivation in the left direction, −1 is set to the l at step 160 and l is sequentially decremented (i.e., 1 is subtracted from l).

At step 172, the stored dot number X extracts the minimum l and after that moves to step 174. At step 174, the l with the minimum amount of shift extracted from among the l is designated as a shift amount L in the left direction, and after that this left direction shift amount derivation processing is finished.

For example, with the example shown in Chart 2, by the processing of step 172, a shift amount l where the number of missing dots X is 0 and includes a shift amount l=−3 is extracted. Next, with the processing of step 174, l=−3 where the absolute value of the shift is minimum is set as the shift amount L in the left direction.

Here, returning to the flowchart shown in FIG. 5, the explanation will be continued regarding image data modification processing.

When the shift amount R in the right direction and the shift amount L in the left direction are respectively derived at step 122 and step 124, the number of dots missing $X_R$ of the shift amount R in the right direction and the number of dots missing $X_L$ of the shift amount L in the left direction are compared at step 126.

If the number of dots missing $X_R$ of the shift amount R in the right direction is below the number of dots missing $X_L$ of the shift amount L in the left direction, the determination at step 126 becomes affirmative, the process moves to step 128, and the shift amount R in the right direction is set as the shift amount. After that, the process moves to step 132.

On the other hand, when a negative determination made at step 126, the process moves to step 130 and the shift amount L in the left direction is set as the shift amount. After that, the process moves to step 132.

Namely, when two types of shift amounts where the numbers of missing dots X are the minimum in two different shift directions are selected, the shift amount where the number of missing dots X is least is further selected from the selected two types. In addition, when the number of missing dots X of the amount of shift in the right and left directions is the equal, the shift amount in the right direction is selected preferentially.

Note that with the examples shown in the above Chart 1 and Chart 2, the number of missing dots $X_L$ is 0 and the number of missing dots $X_R$ is 5 so the amount of shift is set as a shift amount in the left direction of −3.

At step 132, it is determined whether the variable n is less than 4 and when an affirmative determination has been made, it is determined that the setting of the shift amount for all colors has not yet been completed, and the process moves to step 134.

At step 134, the variable n is incremented (i.e., 1 is added to n) and after that the process returns to step 120 again.

When the respective shift amounts are set to every recording head 18Y, 18M, 18C, 18K of each color in this manner, a negative determination is made at step 132 and the process moves to step 136.

At step 136, processing for decreasing the color deviation is executed by the image data modification unit 64, after which this image data modification processing is finished.

Here, with the present exemplary embodiment, for processing to reduce color deviation in step 136, the number of nozzles at the time the recording data is modified is further modified, so that the amount of position deviation for pixels of the respective same color is within the range of a preset amount. Further, for processing to reduce color deviation in step 136, the number of nozzles at the time the recording data is modified is further modified, so that the position deviation of the pixels of the respective same color is reduced when the amount of position deviation for pixels of the respective same color is at or above the preset amount.

Figure 8:
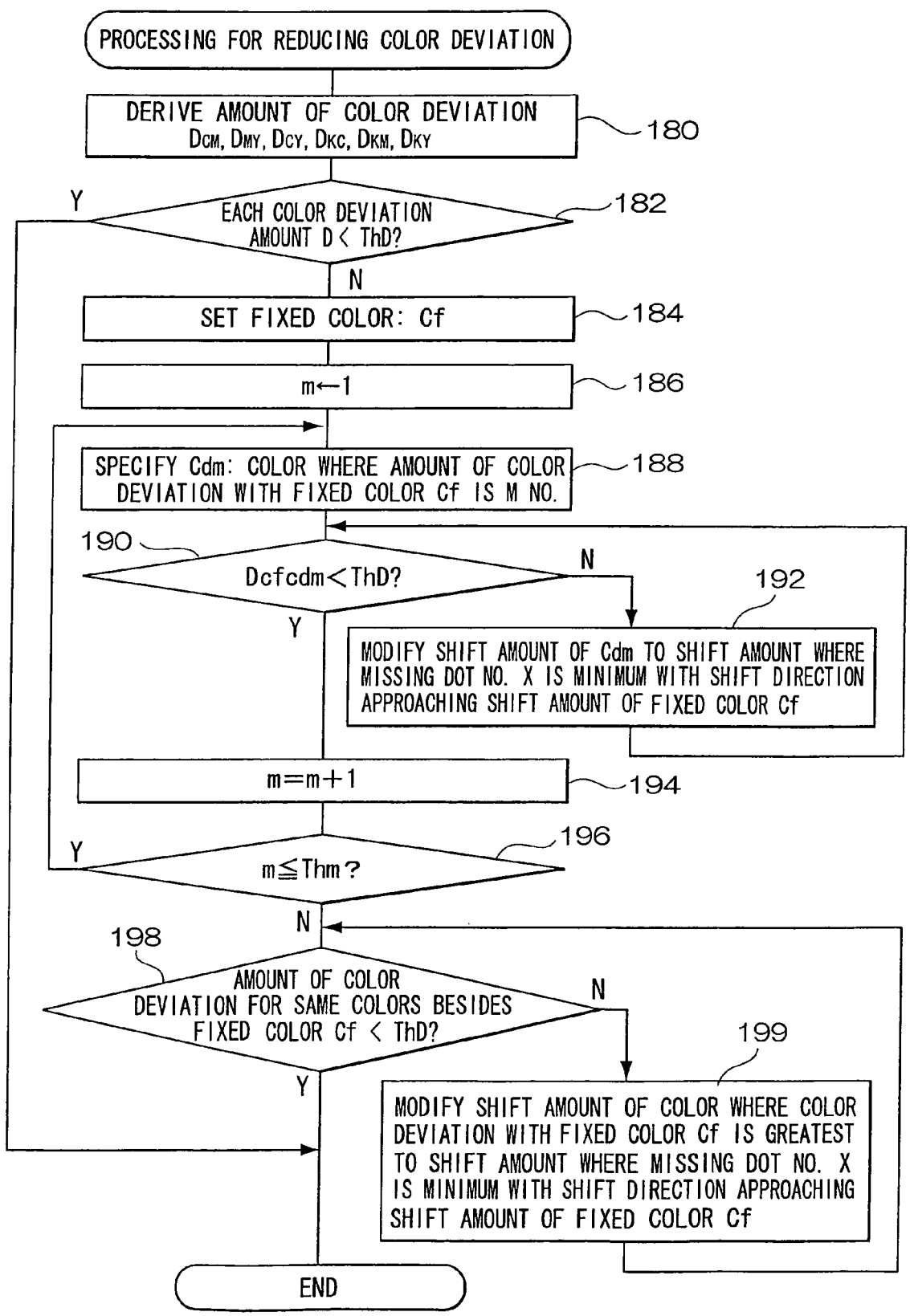
FIG. 8 is a flowchart showing the flow of processing for reducing color deviation that is executed in the image data modification processing (shift processing)

The flow of the processing for reducing color deviation that is executed by the image data modification unit 64 is shown in FIG. 8 (see step 136 in FIG. 5). Below, the processing for reducing color deviation according to the present exemplary embodiment will be explained while referring to FIG. 8.

First, for the amount of color deviation D at step 180, the following are derived: the amount of color deviation $D_{CM}$ between cyan and magenta; the amount of color deviation $D_{MY}$ between magenta and yellow; the amount of color deviation $D_{YC}$ between yellow and the cyan; the amount of color deviation $D_{KC}$ between black and cyan; the amount of color deviation $D_{KM}$ between black and magenta; and the amount of color deviation $D_{KY}$ between black and yellow. The amount of color deviation D is the relative amount of shift between the two colors. For example, when the shift amount of cyan is +2, the shift amount of magenta is +7, and the shift amount of yellow is −4, the amount of color deviation between cyan and magenta $D_{CM}=|(+2)-(+7)|=5$, and the amount of color deviation $D_{MY}$ between magenta and yellow=$|(+7)-(-4)|=12$.

At the next step 182, it is determined whether the amount of derived deviation D for each color is less than the threshold ThD that is set in advance. Note that with regard to the amount of color deviation D, the smaller the value the better the image quality, and the greater the value is the greater the possibility of image quality deterioration. For this reason, when considering factors such as image quality deterioration caused by color deviation due to the occurrence of missing dots (i.e., missing parts of the image or lines therein), the threshold ThD can be appropriately set so that deterioration in image quality becomes within an acceptable range.

Here, when an affirmative determination has been made at step 182, it is determined that the deterioration of picture quality is within an allowable preset range, whereby this processing for reducing color deviation is finished without executing any special processing.

If, on the other hand, the amount of color deviation D is above the threshold ThD by even one, a negative determination is made at step 182 and the process moves to step 184.

At step 184, the shift amount of one color of either Y, M, C, or K is set as a standard, and in order to decrease the amount of color deviation by adjusting the shift amount of the other colors, one of the colors Y, M, C, or K is set as a fixed color Cf that fixes the amount of shift. After that, the process moves to step 186.

For the fixed color Cf, a dark color, or a color where the number of dots recovered by the setting of the amount of shift was most, or a color selected in advance by the user can be applied for the Cf. One example will be explained for when black is set as the dark color.

At step 186, 1 is set as a variable m, and after that the process moves to step 188. At step 188, the color which has mth largest amount of color deviation D from the fixed color Cf is specified as Cdm.

At the next step 190, it is determined whether the amount of color deviation $D_{CfCdm}$ between the fixed color Cf and the specified color Cdm is smaller than the threshold ThD of the above-described amount of color deviation. When this determination is negative, the process moves to step 192 and the shift amount with the least number of missing dots is modified with the shift amount of this color Cdm in a direction that brings it closer to the shift amount of the fixed color Cf (i.e., in the direction where the relative shift amount between the fixed color Cf and that color Cdm becomes smaller), and after that, the process returns to step 190 again.

When, for example, the amount of shift of the fixed color Cf is 20, the shift amount of the Cdm is −3, and the relation between the shift amount of the color Cdm and the number of dots X is as shown in Chart 1 and Chart 2, first (at step 192), the number of missing dots X with the least amount is modified to r=3 of Chart 1 in the direction (right direction) that gets closer to the shift direction of the fixed color Cf from the present shift amount (−3). Next, a determination is made as to whether the amount of color deviation $D_{CfCdm}$=17 after modification at step 190 is smaller than the threshold ThD of the above-described amount of color deviation. When a negative determination is made, the determination at step 192 is performed again and the shift amount of color Cdm is modified in the order of r=5 of Chart 1. In this manner, with each repetition of the processing of step 192, the shift amount of the fixed color Cf is gradually approached closer and closer. Therefore, the amount of color deviation between it and the fixed color also gradually decreases.

When an affirmative determination has been made at step 190, the process moves to step 194, the variable m is incremented (1 is added to m), and after that the process moves to step 196, and it is determined whether the variable m is below the threshold Thm. As the threshold Thm of the variable m, the number of all colors except for the fixed color is set. Accordingly, when the determination made is affirmative, it is determined that there is still a color that was not processed and hence the process returns again to step 188.

On the other hand, when a negative determination is made at step 196, it is determined that the amount of color deviation D between all of the colors and the fixed color is less than the threshold ThD, whereby the process moves to step 198.

At step 198, it is determined whether the amount of color deviation D of the colors besides the fixed color Cf is smaller than the threshold ThD. When a negative determination is made, the process moves to step 199 and the amount of color shift where there is the greatest amount of color deviation with the fixed color Cf is modified to a shift amount with the least amount of missing dots X in a shifting direction that gets even closer to the fixed color Cf. After that, the process returns to step 198 again. The processing of step 199 is performed based on the processing of the above-described step 192.

Namely, the shift amount is gradually brought closer to the fixed color Cf so with the exception of the fixed color, the amount of color deviation of the colors decreases with the processing of step 199.

On the other hand, when an affirmative determination has been made at step 198, this processing for reducing color deviation is finished.

Note that in this first exemplary embodiment, after adjusting the amount of color deviation $D_{CfCdm}$ with the fixed color Cf in the processing to reduce color deviation, an embodiment was explained where the amount of color deviation D between the colors (except for the fixed color) is adjusted, however, the present invention is not thus limited.

For example, the process can be made so that the fixed color Cf is consecutively modified, and steps 186 to 196 are repeated as standards for designating each color.

In addition, when the color deviation of the colors other than the fixed color Cf is not conspicuous, the processing of steps 198 to 199 can be safely omitted.

Furthermore, when the color deviation is not conspicuous, the color deviation reduction processing of step 136 can be omitted. For example, the amount of color deviation is limited within a preset range set by the thresholds Thr and Thl when calculating the amount of shift, so when the thresholds Thr and Thl are small, the color deviation is not conspicuous and deterioration of image quality can be kept within an allowable range, even if the color deviation reduction processing of step 136 is omitted.

Second Exemplary Embodiment

In the above-described first exemplary embodiment, an embodiment was explained where the image data modification processing by the image data modification unit 64 involves shifting the entire dot data in units of one dot at a time in the direction of arrangement of the ejection nozzles N so that the number of dots the faulty nozzle should output decreases, and modification is performed so the recording position of the entire image is made to shift. With the second exemplary embodiment, an embodiment will be explained where modification is performed so that ejection nozzle N dot data, where the positions of faulty nozzles are positioned within a preset range, and dot data of the faulty nozzles are switched. This switching is performed so that the number of dots that the faulty nozzle should output is decreased.

Note that the present second exemplary embodiment differs with the above-described first exemplary embodiment only in the content of the image data modification processing in the image data modification unit 64. The device configuration and configuration of the control system of the image recording device 10 according to the second exemplary embodiment are the same as in the first exemplary embodiment. Because of this, with the present second exemplary embodiment, the same numbers are attached to the device configuration and configuration of the control system of the image recording device 10, and explanations thereon will be omitted.

Figure 11A:
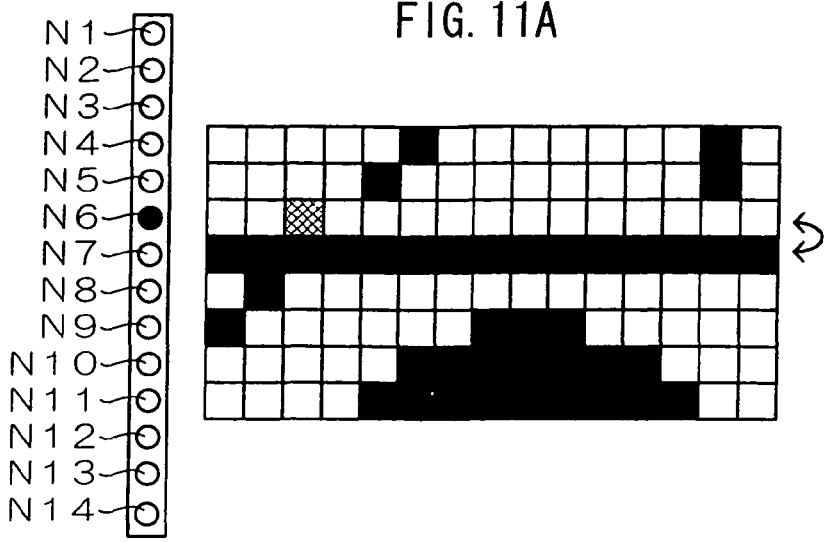
FIG. 11A to FIG. 11C are drawings showing the dot data that should be outputted by the faulty nozzle is switched with the dot data that other ejection nozzles would respectively record in the embodiment shown in FIG. 9B.
Figure 11B:
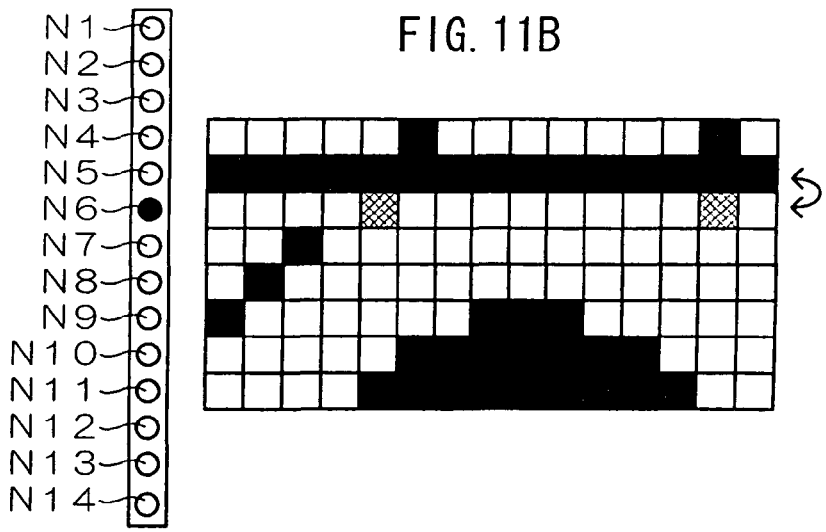
Figure 11C:
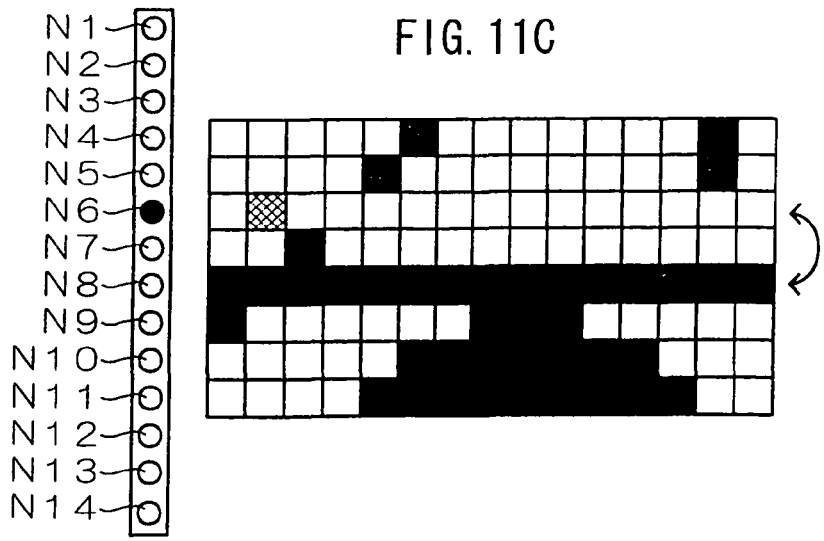

FIG. 11A, FIG. 11B, and FIG. 11C each show as an example a state where the image data showed in FIG. 9A (where the faulty nozzle from FIG. 11A to FIG. 11C is N 6) is switched with the dot data of an ejection nozzle N whose position is within a preset range with the particular faulty nozzles.

Note that from FIG. 11A to FIG. 11C, as with FIG. 9A and FIG. 9B, these drawings show with patterns the relation between the ejection nozzle N of the recording head 18 and the dot data that each ejection nozzle N records. The ejection nozzles N are shown as white circles and the faulty nozzle is shown as a circle filled in black. Also, the dot data is shown as being quadrangular and the dots that should eject ink are shown filled in with black. In addition, the numbers attached to the ejection nozzles N are the identification data for the ejection nozzles N, and these are assigned the numbers 1 to 14.

In addition, as with from FIG. 9A to FIG. 9B and from FIG. 10A to FIG. 10B, with FIG. 11A to FIG. 11C, in order to avoid complicating the explanation, the number of ejection nozzles N is 14 and the dot data is for eight ejection nozzles N. Nonetheless, in an actual recording head 18, many ejection nozzles N are provided in accordance with factors such as the resolution of the image recording device 10 and the size of the recording paper P that can be used with the image recording device 10.

FIG. 12 is a flowchart that shows the flow of the image data modification processing that is executed by the image data modification unit 64 according to the second exemplary embodiment. Below, the image data modification processing according to the second exemplary embodiment will be explained while referring to FIG. 12.

First, at step 200, the variable n is designated as 1. At step 202, faulty nozzle data of the color identification number n is read out from the ROM 42.

Note that in the second exemplary embodiment as well, explanations will be made where the color identification number n is so that n=1 for Y, n=2 for M, n=3 for C, and n=4 for K.

At the next step 203, the number m, that shows the faulty nozzle that will be processed, is made 1, from among the faulty nozzles included in the faulty nozzle data, and after that the process moves to step 204.

At step 204, a variable k is designated as 0. Then at the following step 206, the dot number X to be recorded by the kth nozzle from the faulty nozzle m is counted.

At the following step 208, a relation is attached between the value of variable k and the number of counted dots X and then stored. After that, the process moves to step 210.

At step 210, it is determined whether the variable k is smaller than the threshold Thk and when an affirmative determination has been made, the process moves to step 212 and the variable k is incremented (i.e., 1 is added to k). After that, it returns to step 206 again.

If, on the other hand, a negative determination is made at step 210, the process moves to step 214 and the variable k is set as −1. After that, the process moves to step 216.

At step 216, the dot number X to be recorded by the nozzle that is k number from the faulty nozzle m is counted. At the following step 218, a relation is attached between the value of the variable k and the number of dots X counted and then stored. After that, the process moves to step 220.

At step 220, it is determined whether the variable k is greater than the threshold Thk and when an affirmative determination has been made, the process moves to step 222 and the variable k is decremented (i.e., 1 is subtracted from the k). After that, the process returns to step 216 again.

If, on the other hand, a negative determination is made at step 220, the process moves to step 224.

In this manner, the stored variable k and the dot number X become as shown in the example of Chart 3 below. Note that the variable k corresponds to the position from the faulty nozzle m of the ejection nozzle N. In Chart 3, a case is illustrated where the Thk is set to 8. The value of this Thk can be appropriately set in consideration of factors such as pitch of distribution of ejection nozzles N, resolution, and the allowable range of picture quality deterioration.

CHART 3

| Amount of shift in the L. direction and number of dots | |
|---|---|
| Ejection nozzle position: k | Number of dots: X |
| 8 | 30 |
| 7 | 85 |
| 6 | 70 |
| 5 | 100 |
| 4 | 5 |
| 3 | 3 |
| 2 | 3 |
| 1 | 0 |
| 0 | 120 |
| −1 | 20 |
| −2 | 10 |
| −3 | 0 |
| −4 | 50 |
| −5 | 70 |
| −6 | 90 |
| −7 | 77 |
| −8 | 36 |

In this manner, with the processing of steps 204 to 222, the faulty nozzle m and the number of dots X that will be recorded by the ejection nozzle N whose position is within a preset range from the faulty nozzle m can be obtained.

At step 224, the stored dot number X with the minimum k is extracted and after that, the process moves to step 226. At step 226, the k with the least absolute value is selected from among the extracted k, and then the process then moves to step 228. At step 228, the dot data of the ejection nozzle shown by the selected k and the dot data of the faulty nozzle m are switched. After that, the process moves to the next step 229.

For example, with the example shown in Chart 3, the variables k=1, k=−3 are extracted when the dot number X is 0 with the processing of step 224. Next, due to the processing of step 226, the k where the absolute is small is selected, i.e., k=1 is selected as the ejection nozzle closest to the faulty nozzle m.

At step 229, it is determined whether the value of m is greater than the number of faulty nozzles of the color identification number n. When a negative determination is made, it is determined that processing has not yet been performed for all the faulty nozzles of n color, and the process moves to step 234. At step 234, the value of m is incremented (i.e., 1 is added to m) and after modifying the faulty nozzles to be processed, the process moves again to step 204. On the other hand, when an affirmative determination has been made at step 229, the processing concerning all faulty nozzles of the color identification number n is finished, it is determined that the processing concerning the color identification number n is finished, and the process moves to step 230.

At step 230, it is determined whether the variable n is smaller than 4 and when an affirmative determination has been made, it is determined that switching of the image data concerning all colors has yet to be completed, and the process moves to step 232.

At step 232, the variable n is incremented (i.e., 1 is added to the n) and after that the process returns to step 202 again.

In this manner, when switching of the respective image data for each of the recording heads 18Y, 18M, 18C, 18K of each color is executed, a negative determination is made at step 230 and the present image data modification processing ends.

Third Exemplary Embodiment

With the present third exemplary embodiment, an embodiment will be explained where the shift processing explained in the above-described first exemplary embodiment and the switch processing explained in the above-described second exemplary embodiment are selectively executed as the image data modification processing by the image data modification unit 64.

Note that with regard to the present exemplary embodiment as well, only the content of the image data modification processing at the image data modification unit 64 differs from each of the above-described exemplary embodiments. With regard to the device configuration of the image recording device 10 and the configuration of the control system according to this third exemplary embodiment, these are the same as in each of the above-described exemplary embodiments. Due to this, with the third exemplary embodiment, the same numbers as in the above-described first exemplary embodiment are assigned for the device configuration of the image recording device 10 and the configuration of the control system, and explanations thereon have been omitted.

Figure 13:
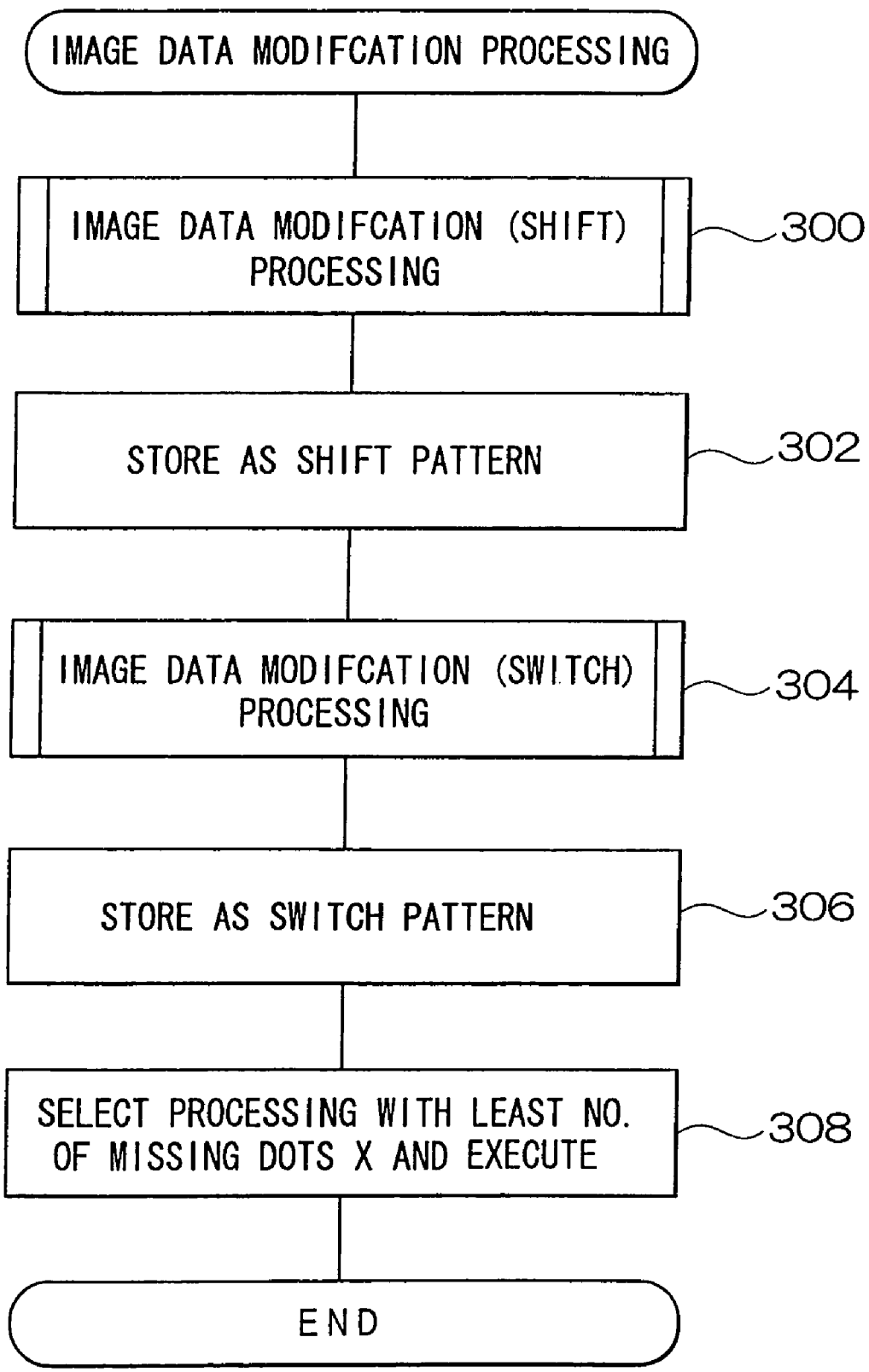
FIG. 13 is a flowchart showing the flow of image data modification processing executed in the image recording processing according to a third exemplary embodiment.

FIG. 13 is a flowchart that shows the flow of image data modification processing executed by the image data modification unit 64 according to the third exemplary embodiment. Hereafter, FIG. 13 will be referred to and the image data modification processing according to the third exemplary embodiment will be explained.

First, at step 300, the image data modification processing (i.e., shifting, see FIG. 5) that was explained with the above-described first exemplary embodiment is executed once. After that, the process moves to step 302, and the amount of shift for each color in where shifting was executed and the number of missing dots X are stored as shift pattern data.

At the following step 304, the image data modification processing (i.e., switching, see FIG. 12) that was explained with the above-described second exemplary embodiment is executed. After that, the process moves to step 306, and the switched position for each color where switching was executed and the number of missing dots are stored as switched pattern data.

After that, the process moves to step 308 and the shift pattern data and the switched pattern data for each color are compared, and the processing whose number of missing dots X is least is selected and executed.

Note that with the third exemplary embodiment, an embodiment was explained where at step 308, the processing with the least number of missing dots X was selected, however, the present invention is not limited to this.

For example, the color deviation can be paid attention to and the degree of color deviation between each color can be detected for all the selection patterns, such as shown in Chart 4 below. Here, a pattern can be selected that reduces the occurrence of overall color deviation. A pattern that can reduce the occurrence of color deviation as a whole is a pattern that, for example, has a color deviation D smaller than the preset threshold ThD and where the sum of the number of missing dots X of each color becomes a minimum.

CHART 4

| Pattern | Y | M | C | K |
|---|---|---|---|---|
| 1 | Shift | Shift | Shift | Shift |
| 2 | Shift | Shift | Shift | Switch |
| 3 | Shift | Shift | Switch | Shift |
| 4 | Shift | Switch | Shift | Shift |
| 5 | Switch | Shift | Shift | Shift |
| 6 | Shift | Shift | Switch | Switch |
| 7 | Shift | Switch | Switch | Shift |
| 8 | Switch | Shift | Shift | Switch |
| 9 | Switch | Switch | Shift | Shift |

CHART 4-continued

| Pattern | Y | M | C | K |
|---|---|---|---|---|
| 10 | Switch | Shift | Switch | Shift |
| 11 | Shift | Switch | Shift | Switch |
| 12 | Shift | Switch | Switch | Switch |
| ... | ... | ... | ... | ... |
|  | Switch | Switch | Switch | Switch |

Furthermore, with this present exemplary embodiment, an embodiment was explained where the pattern data of two processes are derived, after which the processing with the least number of missing dots X is selected, however, the present invention is not limited to this.

For example, the embodiment can be made so that either one of the processes are selected based on the condition of the image recorded in advance. When, for example, recording an image where there are many lines that are slanted with relation to the direction of arrangement of the ejection nozzles N (i.e., a case such as when analysis of the image is easy based on image data and the like), shift processing can be used. When recording an image where there are many lines that are perpendicular to the direction of the arrangement of the ejection nozzles N, the switch processing can be used.

Fourth Exemplary Embodiment

With the above-described third exemplary embodiment, an embodiment was explained where either shifting or replacing is selectively executed as the image data modification processing performed by the image data modification unit 64. With the present fourth exemplary embodiment, an embodiment will be explained where the image data modification processing by the image data modification unit 64 involves executing switching after executing shifting.

Note that with the present fourth exemplary embodiment as well, only the contents of the image data modification processing in the image data modification unit 64 differ from each of the above-described exemplary embodiments. The device configuration and the configuration of the control system of the image recording device 10 according to the fourth exemplary embodiment are the same as in each of the above-described exemplary embodiments. Due to this, with the fourth exemplary embodiment, the same numbers as in the above-described first exemplary embodiment are assigned for the device configuration of the image recording device 10 and the configuration of the control system, and explanations thereon have been omitted.

Figure 14:
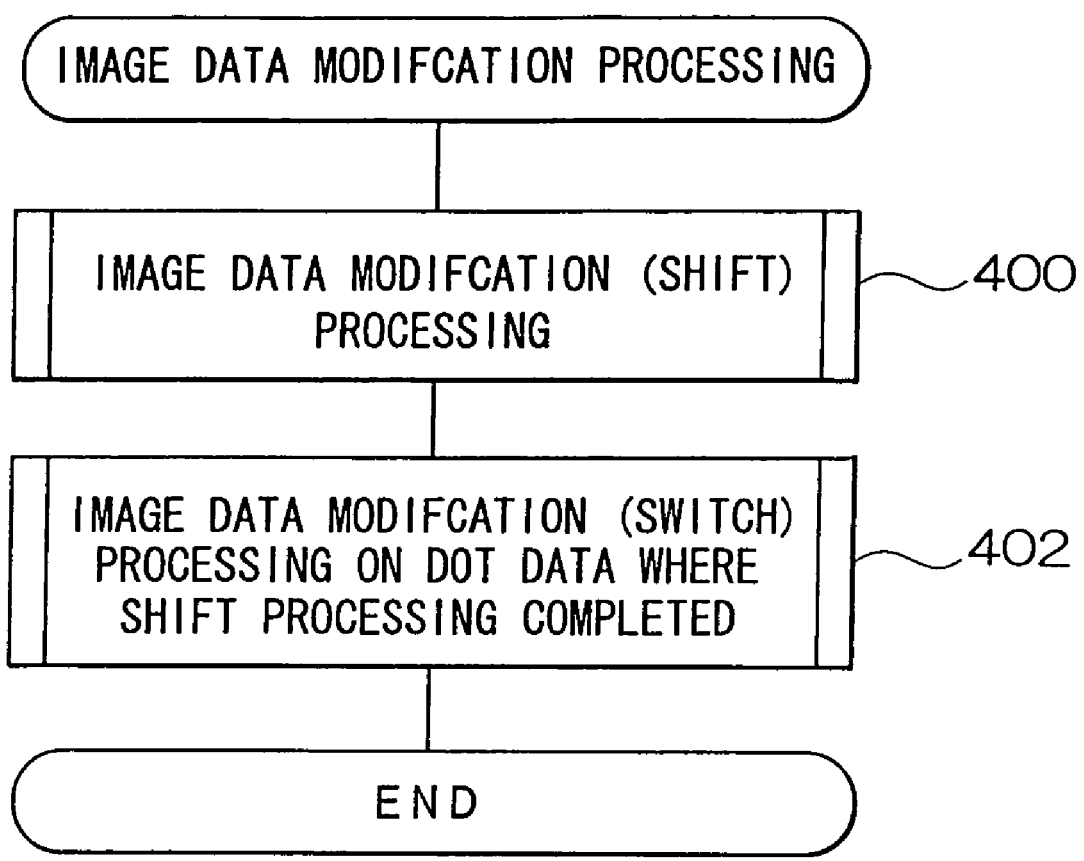
FIG. 14 is a flowchart showing the flow of image data modification processing executed in the image recording processing according to a fourth exemplary embodiment.

FIG. 14 is a flowchart that shows the flow of the image data modification processing executed by the image data modification unit 64 according to the fourth exemplary embodiment. Hereafter, the image data modification processing according to the fourth exemplary embodiment will be explained while referring to FIG. 14.

First, at step 400, the image data modification processing (i.e., shift processing, see FIG. 5) that was explained with the above-described first exemplary embodiment is executed. After that, the process moves to step 402.

At step 402, the image data modification processing (i.e., switch processing, see FIG. 12) explained with the above-described second exemplary embodiment is executed based on the image data that underwent shift processing and on the faulty nozzle data, after which this image data modification processing is finished.

Note that with the present fourth exemplary embodiment, an embodiment was explained where shift processing is performed first and then switch processing is executed next.

Nonetheless, the embodiment can be made so that shift processing is executed after executing switch processing.

Other Embodiments

Figure 15:
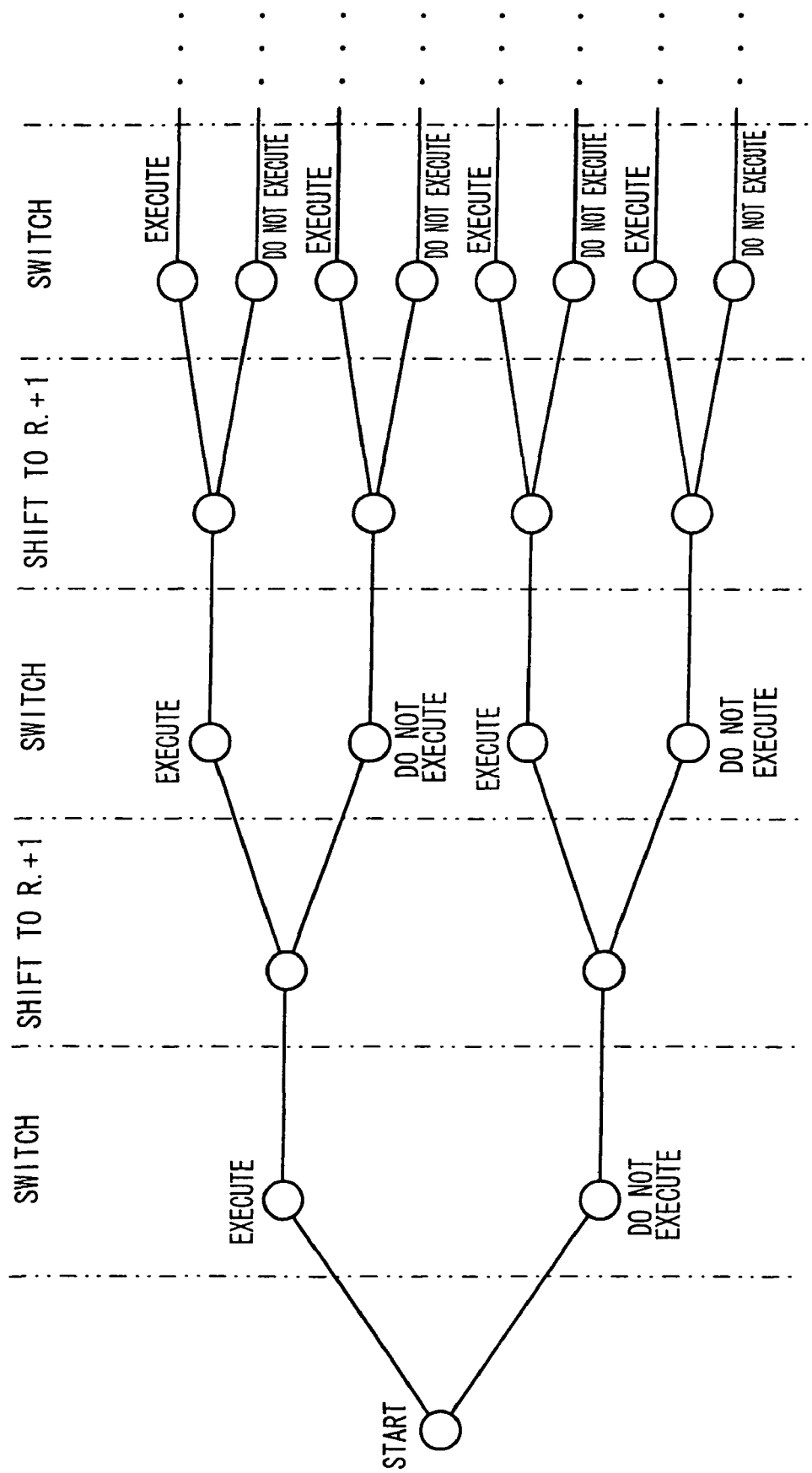
FIG. 15 is an explanatory diagram of a combination of processes according to an alternate example.

FIG. 15 is an explanatory drawing of a case of a combination where shift processing and switch processing are executed alternately. In FIG. 15, the search space of this combination of processes is shown as a branch structure. Searching is initiated from the node shown at the start, and this is diverged into a node that executes switch processing and a node that does not. From these respective nodes, they move to nodes that execute shift processing, and after that, further from each node, they are diverged into nodes that execute switch processing and nodes that do not.

Note that this particular processing repeats divergence only a number of times that is set in advance in accordance with the ranges of each of the thresholds explained with the above-described first exemplary embodiment, and this combination is limited.

As shown in FIG. 15, the amount of shift and switch positions, the execution sequence of processing, and the final number of missing dots X are derived as the modification processing results of the dot data concerning all combinations. From among these derivatives, processing of a combination that has the least number of missing dots X can be executed.

Note that the number of dots X that the faulty nozzles should output is counted for each turning point of branch separation, and when this value is above a preset threshold, it is possible to simplify the processing by not continuing to consider the combination of those branches.

In addition, in FIG. 15, a case was disclosed where the best combination from among the combinations of shift processing and switch processing in the right direction is searched. Nonetheless, with regard to another case where the best combination from among the combinations of shift processing and switch processing in the left direction is searched, the same holds true.

Further, from among the best combination of shift processing and switch processing in the right direction, and from the best combination of shift processing and switch processing in the left direction, the combination with the least number of missing dots X is selected and executed.

Note that the configuration of the image recording device 10 according to each of the above-described exemplary embodiments is but one example, and appropriate modifications that do not deviate from the scope of the present invention are possible.

In addition, the flow of the processes and the like according to each of the above-described exemplary embodiments are but examples, and appropriate modifications that do not deviate from the scope of the present invention are possible.

For example, an embodiment was explained where the faulty nozzle data is stored in advance in the ROM 42. In place of this, the faulty nozzle data can be received from an external device such as a computer that is connected to the image recording device, stored temporarily in the RAM 44, and then used in the image data conversion. In addition, a well-known test pattern that specifies the positions of the faulty nozzles can be printed and the faulty nozzle data can be inputted by the user operating an operation panel on the image recording device. Further, the image recording device can be provided with a device for detecting faulty nozzles and the detection results of that device can be used for the faulty nozzle data.

In addition, with each of the above-described exemplary embodiments, embodiments were explained where FWA-type recording heads are used and the heads are provided with nozzles across the entire region in the widthwise direction of the recording medium that differs from the direction in which the recording medium is conveyed. Nonetheless, the present invention can also be applied to partial-width array (PWA) type recording heads. These recording heads are provided with nozzles arranged so as to face a portion of the widthwise direction that differs from the direction in which the recording medium is conveyed. Images are formed by making the recording heads move and scan in the widthwise direction of the recording medium that differs from the direction in which it is conveyed.

FIG. 16 is an explanatory diagram showing an example of a computer program for when the function of the image data modification processing of the image processing device is implemented by computer program. FIG. 16 also shows a recording medium in which the computer program is stored and a computer. In FIG. 16, the numbers represent as follows: 550 is a program, 552 is a computer, 554 is a magneto-optical disk, 556 is an optical disc, 558 is a magnetic disk, 560 is a memory, 562 is an internal memory, 566 is a reading unit, 570 is a hard disk, 568 and 574 are interfaces, and 572 is the communication unit.

It is possible to implement the functions of a portion or all of each portion of the image processing device explained in the above-described exemplary embodiments with the program 500 that can be executed by computer. In that case, it is also possible to store that program 550 and the data that program uses and the like on a storage medium that is readable by computer. The storage medium is a device that causes a change in the state of energy such as magnetic, optical, or electrical, relative to the reading unit 566 provided at the hardware resource of the computer, in accordance with the description contents of the program. The medium can convey the description contents of the program to the reading unit 566 with a signal's format corresponding to that change in state. For example, this can be a medium such as the magneto-optical disk 554, the optical disc 556 (including a CD or DVD and the like), the magnetic disk 558, or the memory 560 (including an IC card or memory card and the like). These memory media are of course not limited to portable types only.

The program 550 is stored in these memory media. The program 550 is read out from the computer by loading these storage media into, for example, the reading unit 566 or the interface 574 of the computer 552, and the program is stored at the internal memory 562 or the hard disk 570. The program 550 is executed by the CPU 564, whereby the functions of the image processing device can be implemented. Or, the program 550 can also be transferred to the computer 552 through a system such as a network, after which the computer 552 receives the program 550 at the communication unit 572 and stores it in the internal memory 562 or the hard disk 570. In this case, the program 550 is executed by the CPU 564, whereby the functions of the image processing device are implemented. Note that besides the above, various devices can be connected to the computer 552 through the interface 568 (e.g., a display device that displays data can be connected or an input device to which the user inputs information).

Of course, a portion of the functions can be configured by the hardware, or, everything can be included in the hardware configuration. Or it is also possible to configure the program with other configurations.

Note that with these present exemplary embodiments, an example was explained with an inkjet image recording device but the present invention is not thus limited. This can be applied to any droplet ejecting device of various industrial uses, such as to a device that ejects color ink onto a polymer film when making color filters for displays, or when making EL display panels by ejecting organic EL solutions onto a substrate.

In addition, the recording paper P on which an image is recorded with the image recording device 10 widely encompasses recording papers and OHP sheets, as well as of course polymer films and the like, as long as it is an object onto which the recording heads eject droplets.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing device comprising:
    an acquisition unit that acquires image data for recording with a liquid droplet ejecting head having a plurality of ejection nozzles that eject liquid droplets onto a recording medium, and data relating to a faulty ejection nozzle of the liquid droplet ejecting head;
    a generation unit that generates recording data in units of pixels corresponding to the ejection nozzles based on the image data;
    a conversion unit that, based on data relating to the faulty ejection nozzle, converts the recording data in units of rows of pixels to be recorded by each of the ejection nozzles so as to reduce the number of pixels to be recorded by the faulty ejection nozzle; and
    an output unit that outputs the converted recording data to the liquid droplet-ejecting head.

2. The image processing device of claim 1, wherein the conversion unit performs conversion such that each row of pixels corresponding to the respective ejection nozzles is shifted by the same number of nozzles in a preset direction without modifying the arrangement of each pixel of the recording data.

3. The image processing device of claim 2, wherein the generation unit generates the recording data with a plurality of color portions, and the conversion unit performs conversion of the recording data for each color so that the amount of position deviation for pixels of one color stays within an amount range set in advance.

4. The image processing device of claim 1, wherein the conversion unit compares the number of pixels to be recorded by the faulty ejection nozzle with the number of pixels to be recorded by an ejection nozzle that is positioned within a preset range from the position of the faulty ejection nozzle, and when an ejection nozzle exists that is to record a number of pixels that is less than the number of pixels that the faulty ejection nozzle is to record, the pixel row to be recorded by the faulty ejection nozzle is switched with the pixel row of the ejection nozzle where the number of pixels to be recorded is less.

5. The image processing device of claim 1, wherein the conversion unit selectively executes one of the following processes:
    shift processing that performs conversion such that each row of pixels corresponding to the respective ejection nozzles is shifted as a whole by the same number of nozzles in a preset direction without modifying the arrangement of each pixel of the recording data; or
    switch processing that compares the number of pixels to be recorded by the faulty ejection nozzle with the number of pixels to be recorded by an ejection nozzle that is positioned within a preset range from the position of the faulty ejection nozzle, and when an ejection nozzle exists that is to record a number of pixels that is less than the number of pixels that the faulty ejection nozzle is to record, the pixel row to be recorded by the faulty ejection nozzle is switched with the pixel row of the ejection nozzle where the number of pixels to be recorded is less.

6. The image processing device of claim 1, wherein the conversion unit successively executes both processes:
    shift processing that performs conversion such that each row of pixels corresponding to the respective ejection nozzles is shifted by the same number of nozzles in a preset direction without modifying the arrangement of each pixel of the recording data; and
    switch processing that compares the number of pixels to be recorded by the faulty ejection nozzle with the number of pixels to be recorded by an ejection nozzle that is positioned within a preset range from the position of the faulty ejection nozzle, and when an ejection nozzle exists that is to record a number of pixels that is less than the number of pixels that the faulty ejection nozzle is to record, the pixel row to be recorded by the faulty ejection nozzle is switched with the pixel row of the ejection nozzle where the number of pixels to be recorded is less.

7. The image processing device of claim 1, wherein when both of two processes are repeated and executed a preset number of times, the conversion unit derives and executes a processing sequence whereby the number of pixels to be recorded by the faulty nozzle becomes the minimum number, the processes being:
    shift processing that performs conversion such that each row of pixels corresponding to the respective ejection nozzles is shifted by the same number of nozzles in a preset direction without modifying the arrangement of each pixel of the recording data; and
    switch processing that compares the number of pixels to be recorded by the faulty ejection nozzle with the number of pixels to be recorded by the ejection nozzle that is positioned within a preset range from the position of the faulty ejection nozzle, and when an ejection nozzle exists that is to record a number of pixels that is less than the number of pixels that the faulty ejection nozzle is to record, the pixel row to be recorded by the faulty ejection nozzle is switched with the pixel row of the ejection nozzle where the number of pixels to be recorded is less.

8. An image recording device comprising:
    the image processing device of claim 1;
    a liquid droplet-ejecting head that has a plurality of ejection nozzles that eject liquid droplets and which ejects liquid droplets from the ejection nozzles based on the recording data outputted from the image processing device; and
    a conveyance unit for conveying a recording medium to a region where the liquid droplets are ejected by the liquid droplet-ejecting head.

9. The image recording device of claim 8, further comprising an interface that is connectable to an external device, wherein data relating to a faulty ejection nozzle of the liquid droplet-ejecting head is acquired from the interface.

10. The image recording device of claim 8, further comprising an operation panel that can be operated by a user, wherein data relating to a faulty ejection nozzle of the liquid droplet-ejecting head is acquired by being input by an operation of the user.

11. The image recording device of claim 8, further comprising a device for detecting a faulty nozzle, wherein data relating to a faulty ejection nozzle of the liquid droplet-ejecting head is acquired by being detected by the detection device.

12. An image-processing method comprising:
acquiring, by wired or wireless communication, image data for recording by a liquid droplet-ejecting head that has a plurality of ejection nozzles that eject liquid droplets on a recording medium, and data relating to a faulty ejection nozzle of the liquid droplet-ejecting head;
generating recording data in units of pixels corresponding to the ejection nozzles based on the image data;
converting the recording data in units of rows of pixels to be recorded by each of the ejection nozzles based on data relating to the faulty ejection nozzle so as to reduce the number of pixels to be recorded by the faulty ejection nozzle becomes less; and
outputting the converted recording data to the liquid droplet-ejecting head by wired or wireless communication.

13. The image processing method of claim 12, wherein conversion is performed such that each row of pixels corresponding to the respective ejection nozzles is shifted by the same number of nozzles in a preset direction without modifying the arrangement of each pixel of the recording data.

14. The image processing method of claim 13, wherein the recording data is generated with a plurality of colors and the recording data is modified for each color so that the amount of position shift for pixels of one color is within a preset amount range.

15. The image processing method of claim 12, wherein the number of pixels to be recorded by the faulty ejection nozzle is compared with the number of pixels to be recorded by an ejection nozzle that is positioned within a preset range from the position of the faulty ejection nozzle, and when an ejection nozzle exists that is to record a number of pixels that is less than the number of pixels that the faulty ejection nozzle is to record, the pixel row to be recorded by the faulty ejection nozzle is switched with the pixel row of the ejection nozzle where the number of pixels to be recorded is less.

16. The image processing method of claim 12, wherein one of the following processes is selectively executed:
converting, such that each row of pixels corresponding to the respective ejection nozzles is shifted as a whole by the same number of nozzles in a preset direction without modifying the arrangement of each pixel of the recording data; and
switching, where the number of pixels to be recorded by the faulty ejection nozzle is compared with the number of pixels to be recorded by an ejection nozzle that is positioned within a preset range from the position of the faulty ejection nozzle, and when an ejection nozzle exists that is record a number of pixels that is less than the number of pixels that the faulty ejection nozzle is to record, the pixel row to be recorded by the faulty ejection nozzle is switched with the pixel row of the ejection nozzle where the number of pixels to be recorded is less.

17. The image processing method of claim 12, wherein both of the following processes are successively executed:
converting, such that each row of pixels corresponding to the respective ejection nozzles is shifted by the same number of nozzles in a preset direction without modifying the arrangement of each pixel of the recording data; and
switching, where the number of pixels to be recorded by the faulty ejection nozzle is compared with the number of pixels to be recorded by an ejection nozzle that is positioned within a preset range from the position of the faulty ejection nozzle, and when an ejection nozzle exists that is to record a number of pixels that is less than the number of pixels that the faulty ejection nozzle is to record, the pixel row to be recorded by the faulty ejection nozzle is switched with the pixel row of the ejection nozzle where the number of pixels to be recorded is less.

18. The image processing method of claim 12, wherein when both of the following processes are repeated and executed a preset number of times, a processing sequence is derived and executed whereby the number of pixels that the faulty ejection nozzle is to record is a minimum:
converting, such that each row of pixels corresponding to the respective ejection nozzles is shifted by the same number of nozzles in a preset direction without modifying the arrangement of each pixel of the recording data; and
switching, where the number of pixels to be recorded by the faulty ejection nozzle is compared with the number of pixels to be recorded by an ejection nozzle that is positioned within a preset range from the position of the faulty ejection nozzle, and when an ejection nozzle exists that is to record a number of pixels that is less than the number of pixels that the faulty ejection nozzle is to record, the pixel row to be recorded by the faulty ejection nozzle is switched with the pixel row of the ejection nozzle where the number of pixels to be recorded is less.

19. A computer readable medium storing a program causing a computer to execute a process for image processing, the process comprising:
acquiring, by wired or wireless communication, image data for recording with a liquid droplet ejecting head that has a plurality of ejection nozzles that eject liquid droplets onto a recording medium, and data relating to a faulty ejection nozzle of the liquid droplet ejecting head;
generating recording data in units of pixel corresponding to the ejection nozzles based on the image data;
converting the recording data in units of rows of pixels recorded by each of the ejection nozzles based on data relating to the faulty ejection nozzle so as to reduce the number of pixels to be recorded by the faulty ejection nozzle; and
outputting the converted recording data to the liquid droplet ejecting head by wired or wireless communication.

* * * * *